Jan. 26, 1960 A. R. BUCHHOLZ ET AL 2,922,427
COIN DISPENSING MACHINE
Filed Nov. 14, 1955 14 Sheets-Sheet 1

INVENTORS
Arnold R. Buchholz
Frank Haban
BY Quarles & Frank
Att'ys.

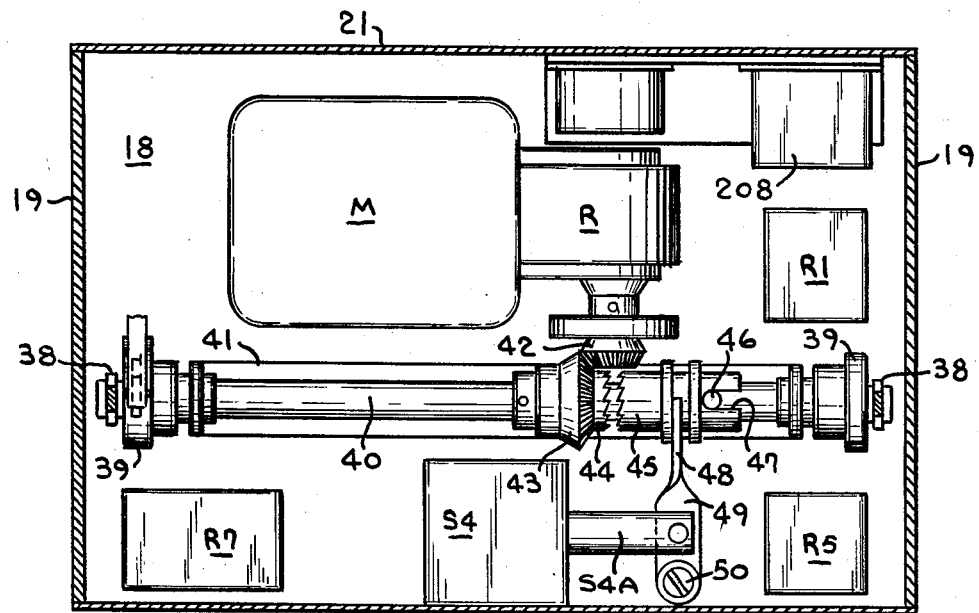
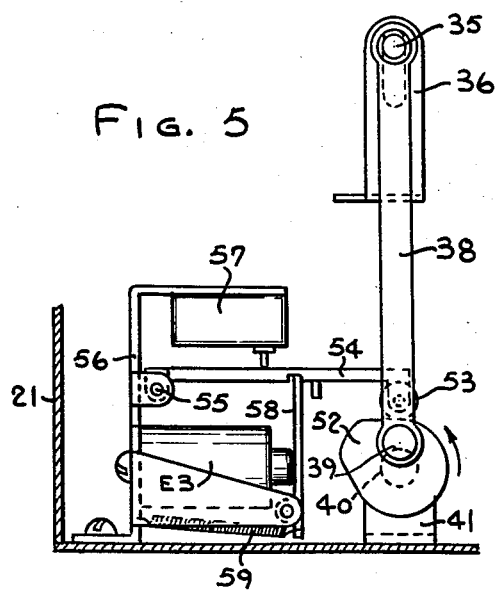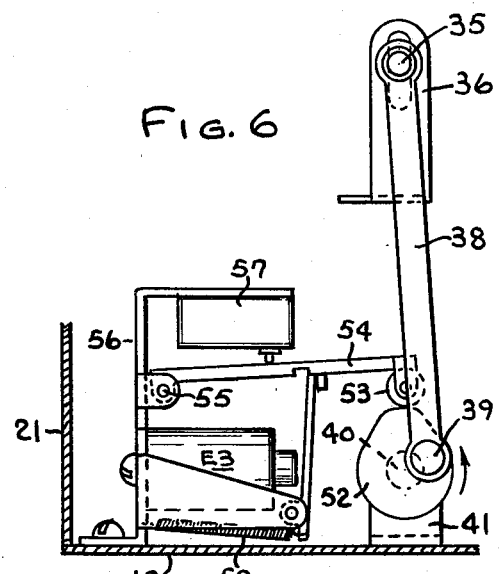

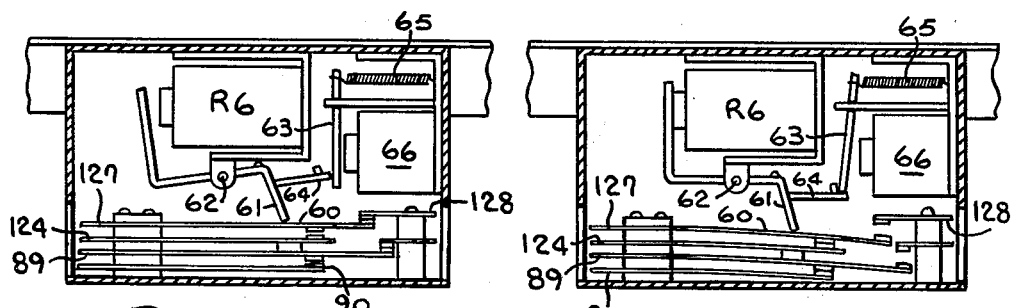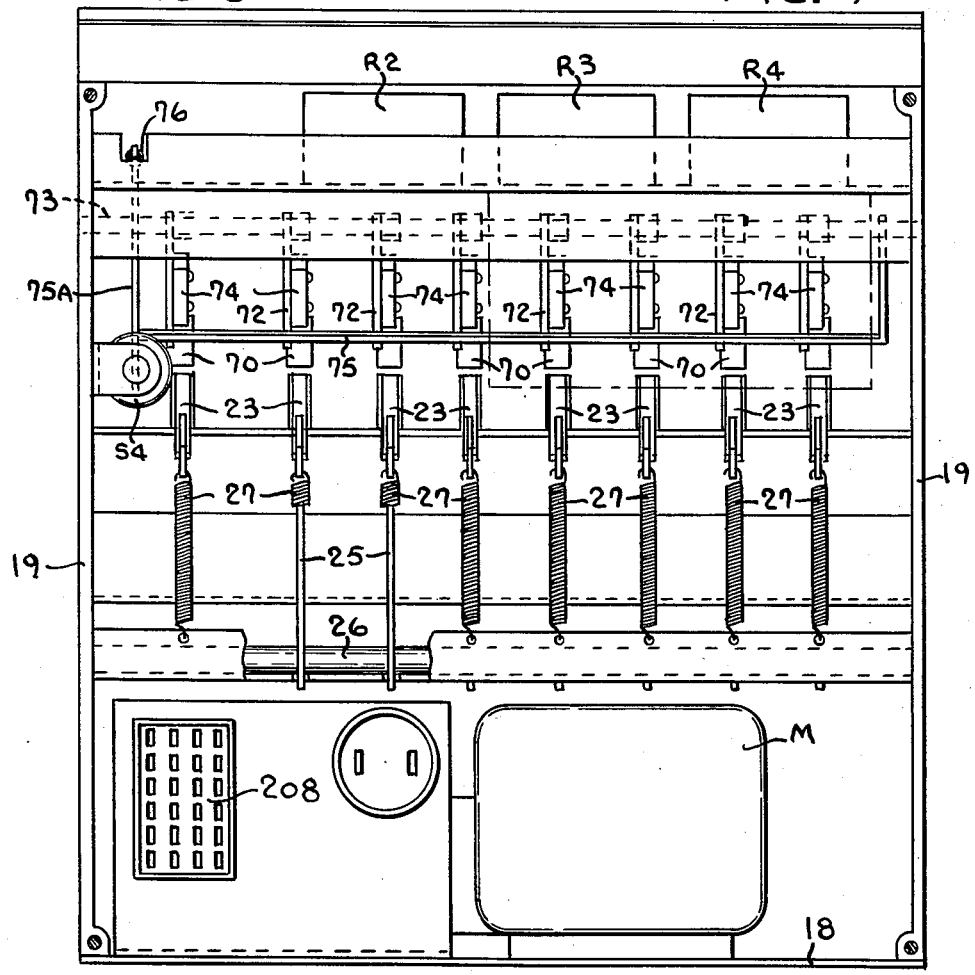

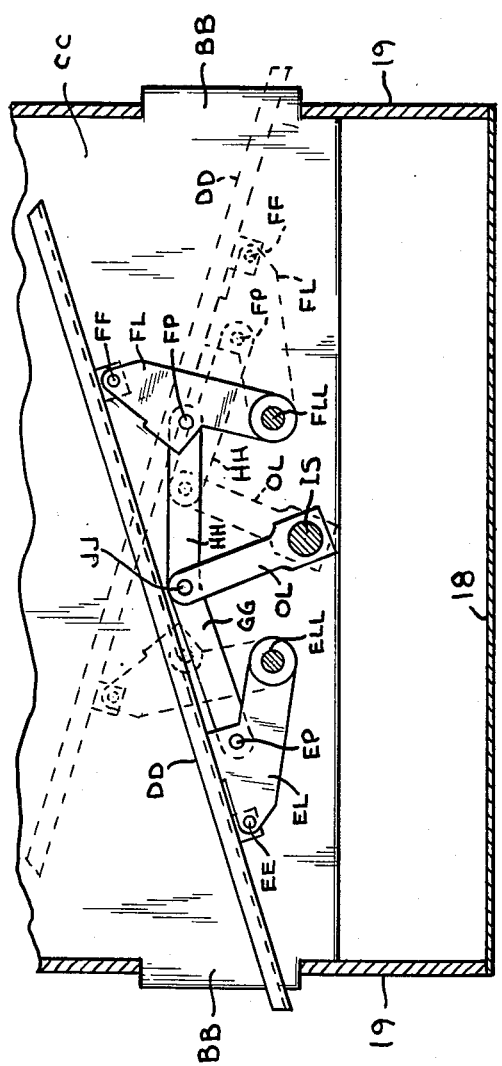
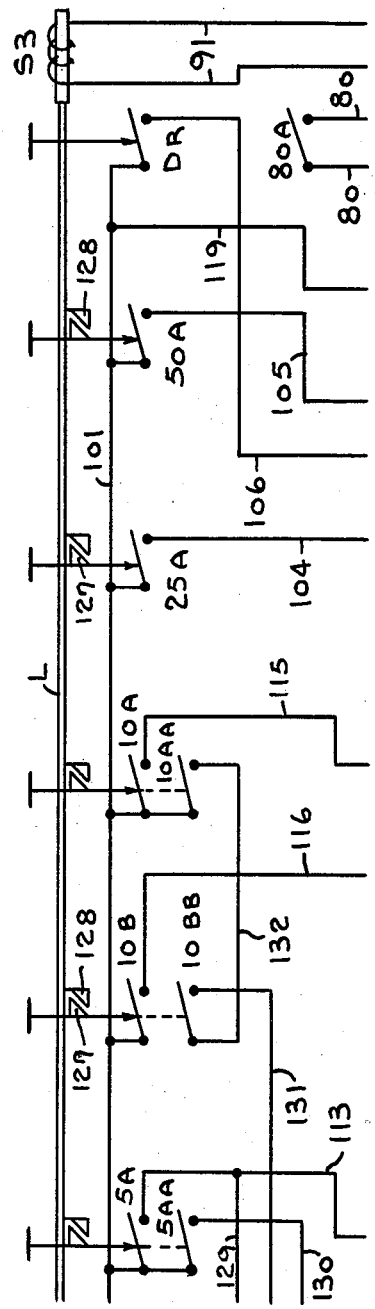

Jan. 26, 1960  A. R. BUCHHOLZ ET AL  2,922,427
COIN DISPENSING MACHINE
Filed Nov. 14, 1955  14 Sheets-Sheet 5
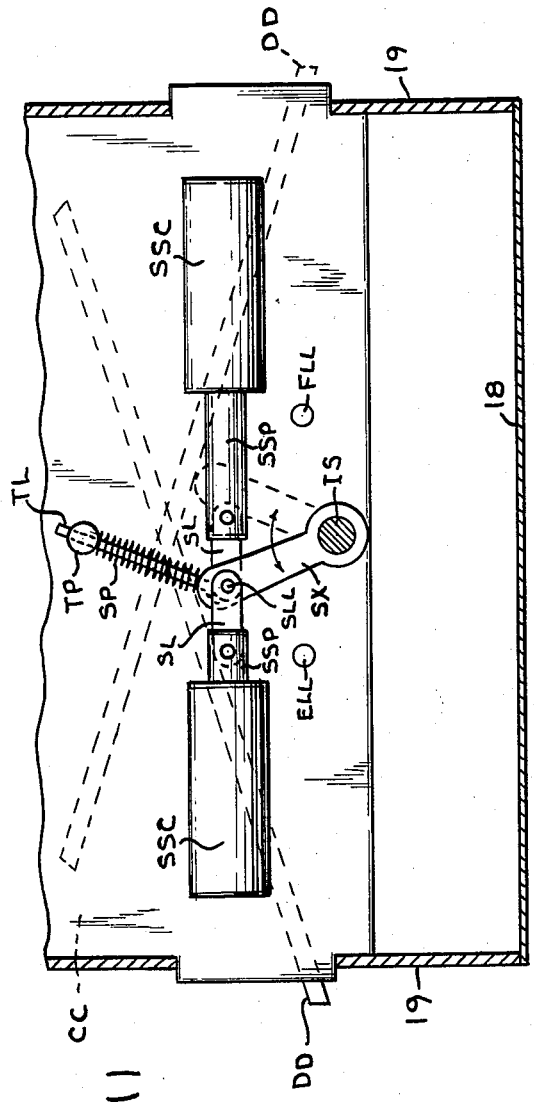
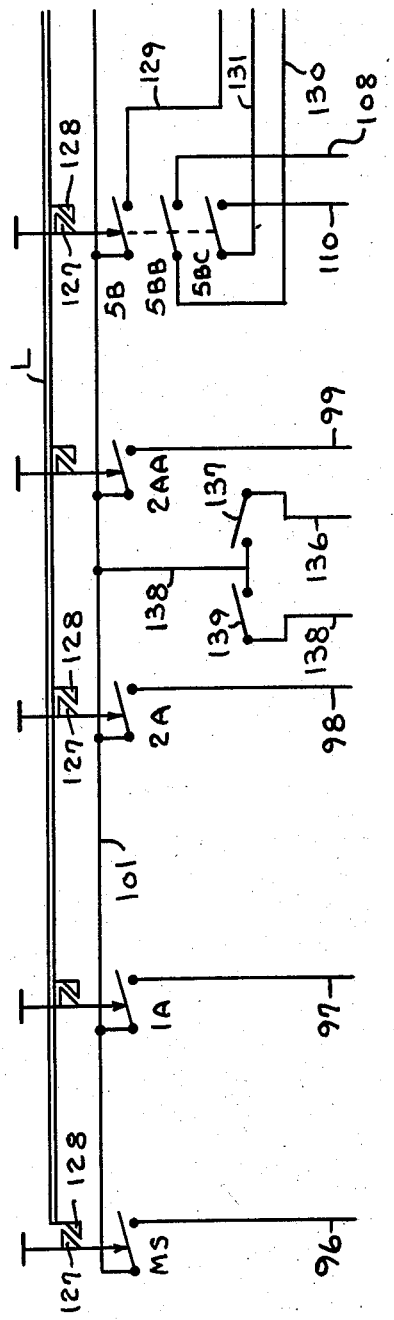
INVENTORS
Arnold R. Buchholz
Frank Haban
BY Charles & French
Attys.

Jan. 26, 1960 A. R. BUCHHOLZ ET AL 2,922,427
COIN DISPENSING MACHINE
Filed Nov. 14, 1955 14 Sheets-Sheet 6

INVENTORS
Arnold R. Buchholz
Frank Haban
BY
Quarles & French
Attys.

Jan. 26, 1960  A. R. BUCHHOLZ ET AL  2,922,427
COIN DISPENSING MACHINE
Filed Nov. 14, 1955  14 Sheets-Sheet 7

INVENTORS
Arnold R. Buchholz
Frank Habau
BY
Quarles & French
Att'ys

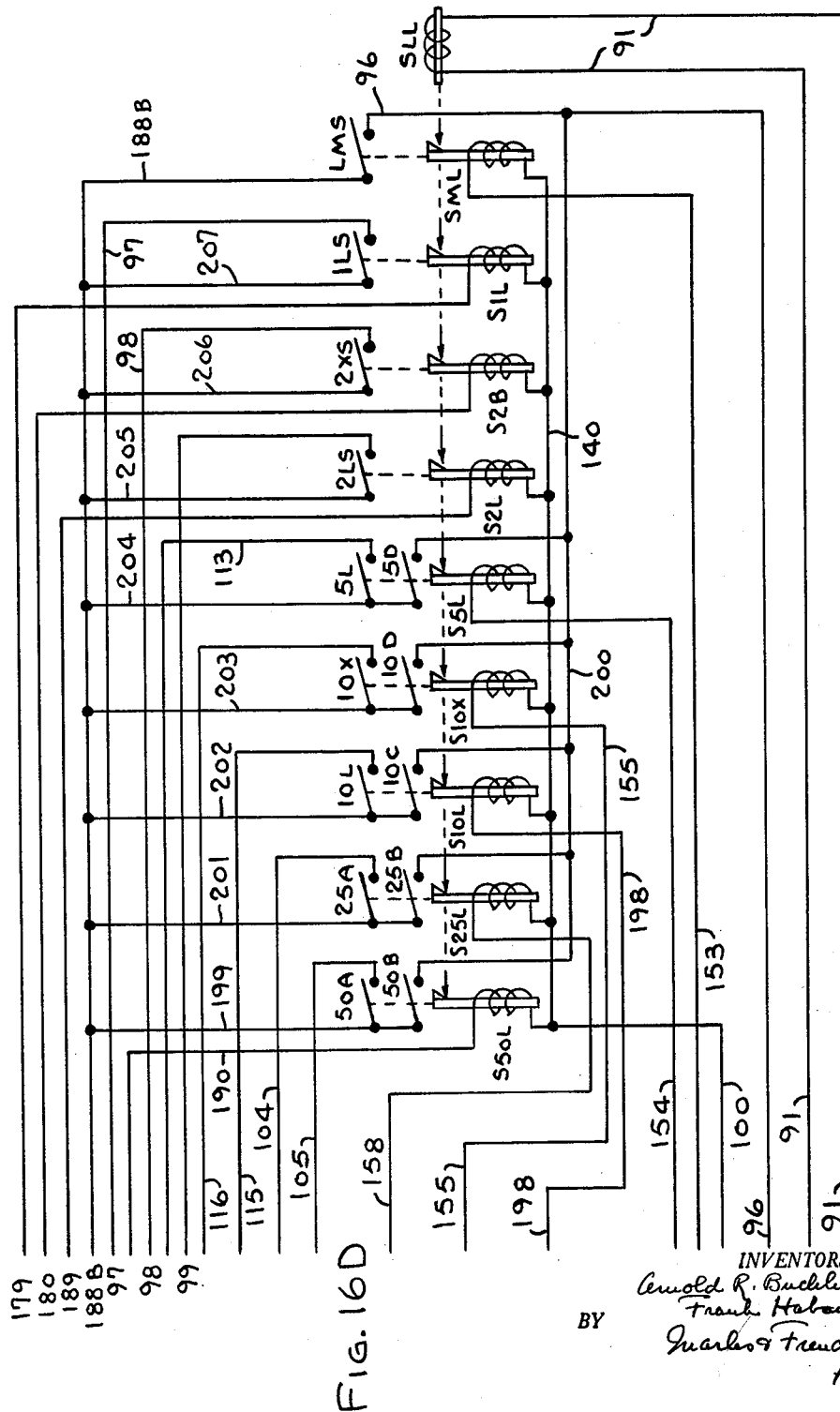

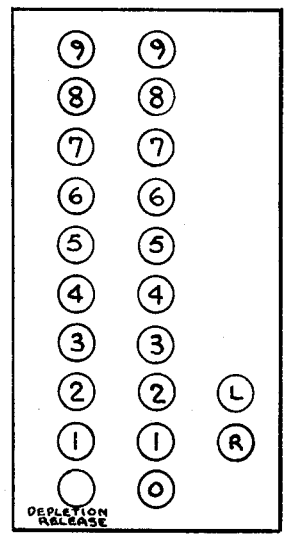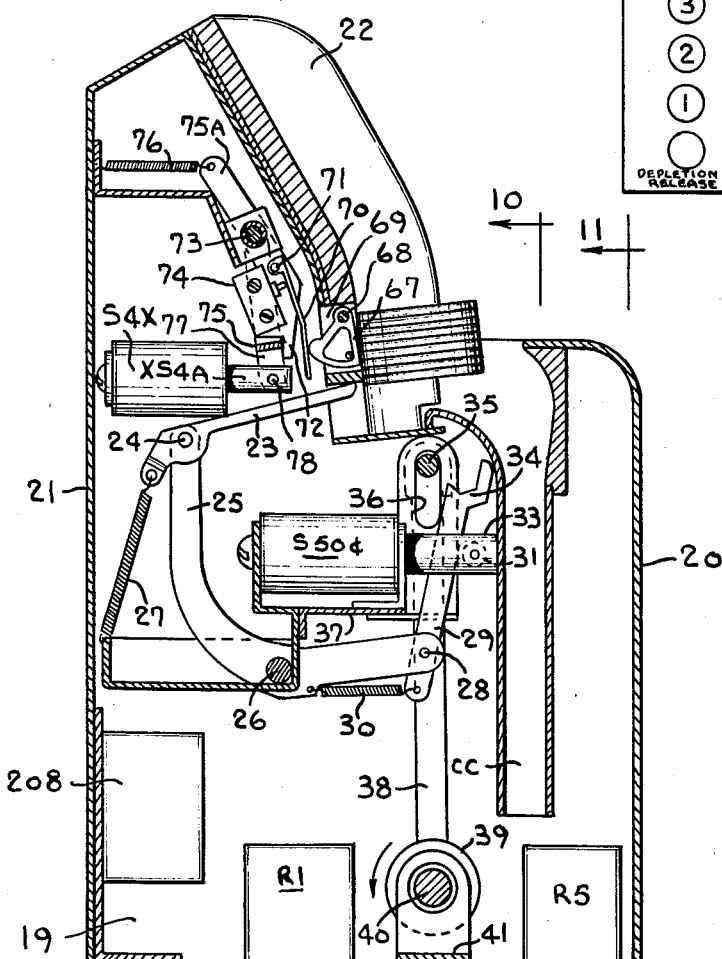

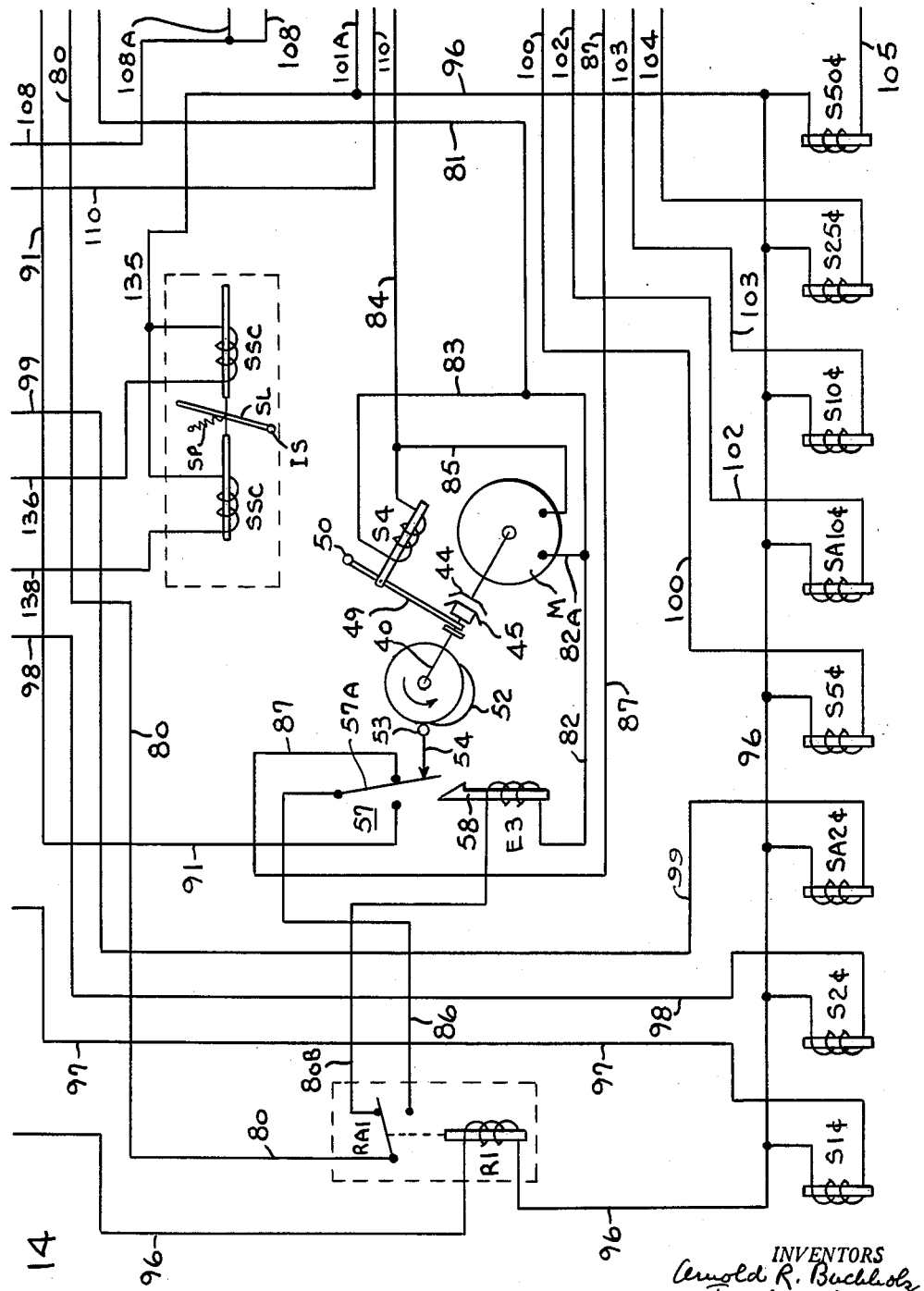

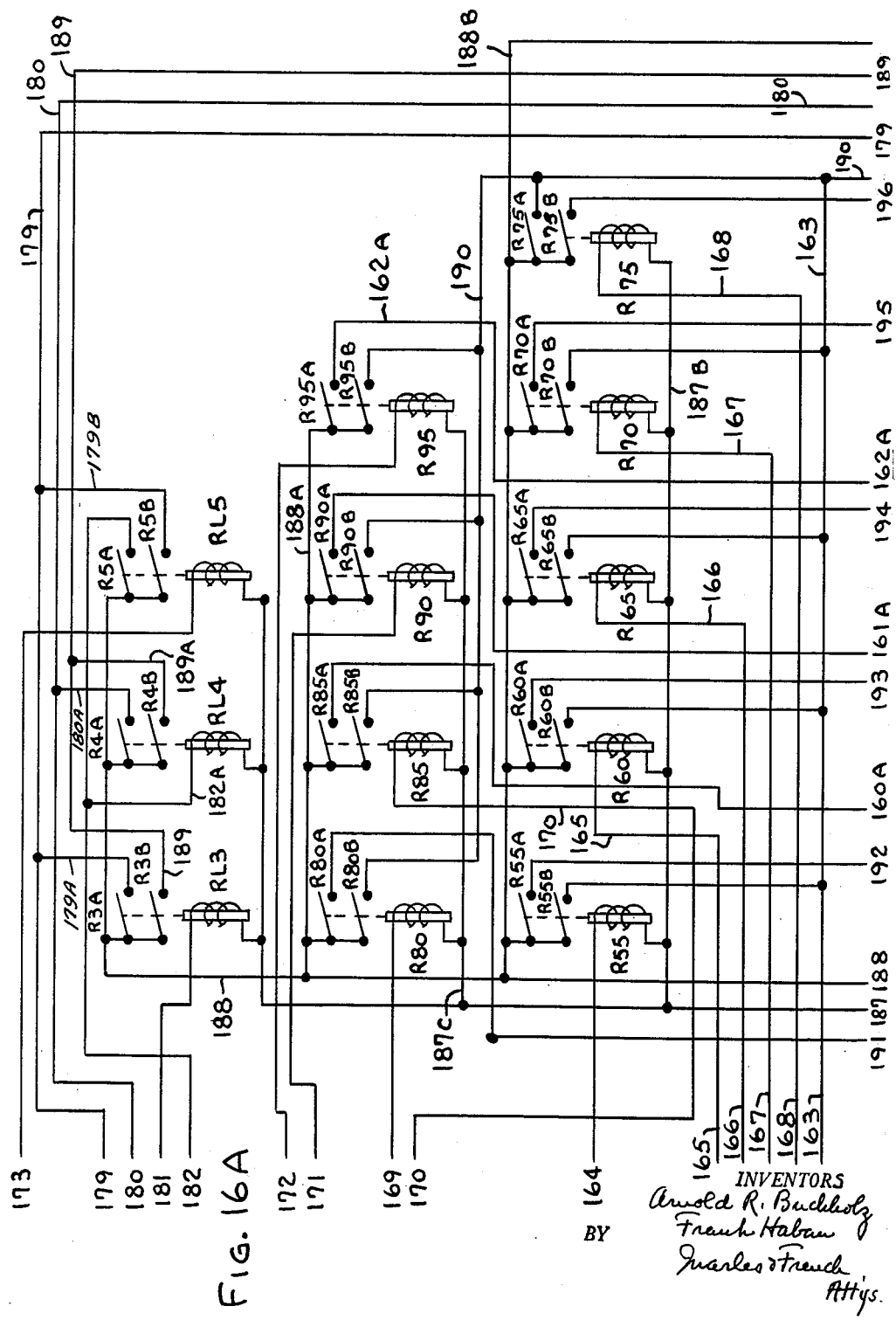

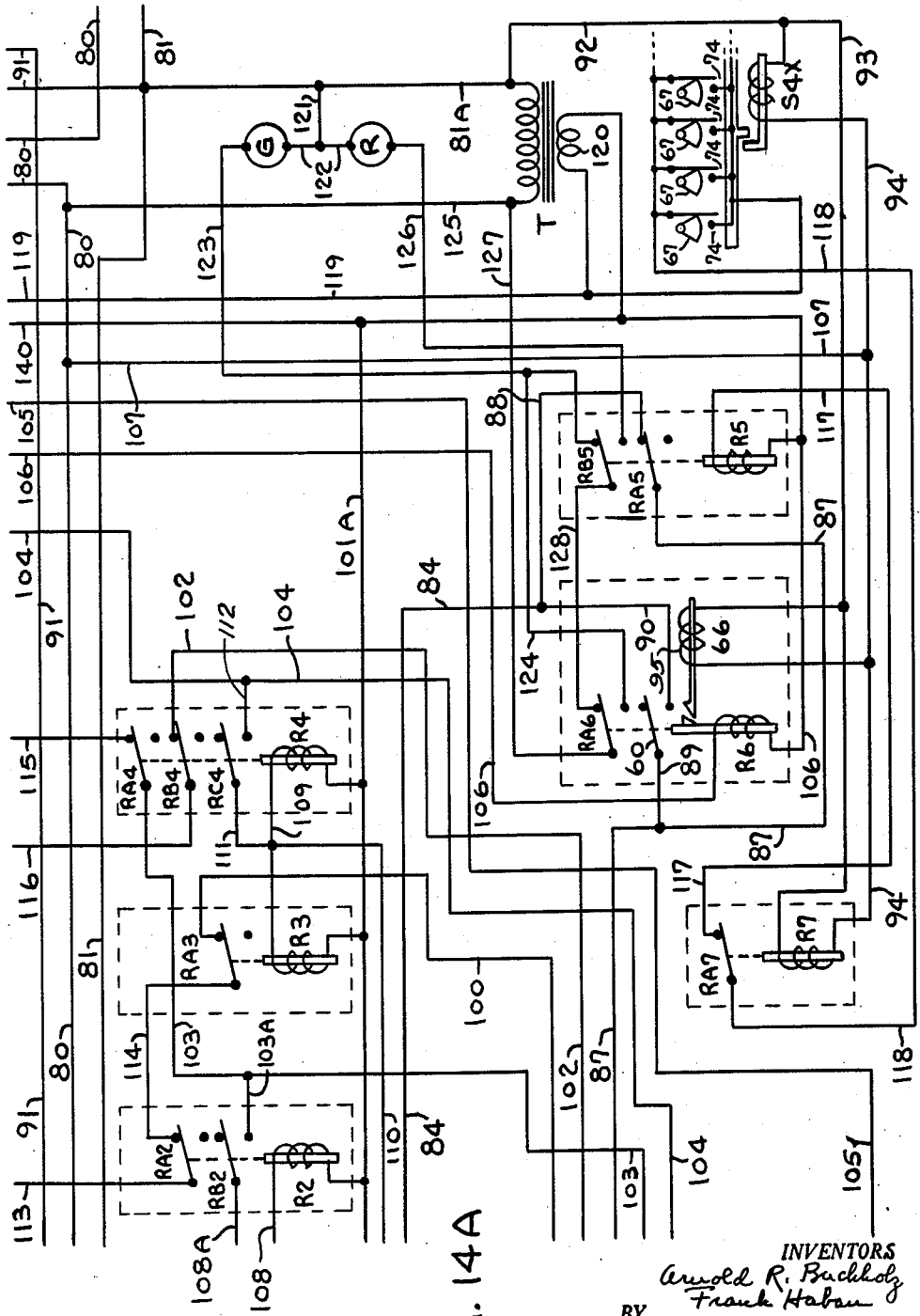

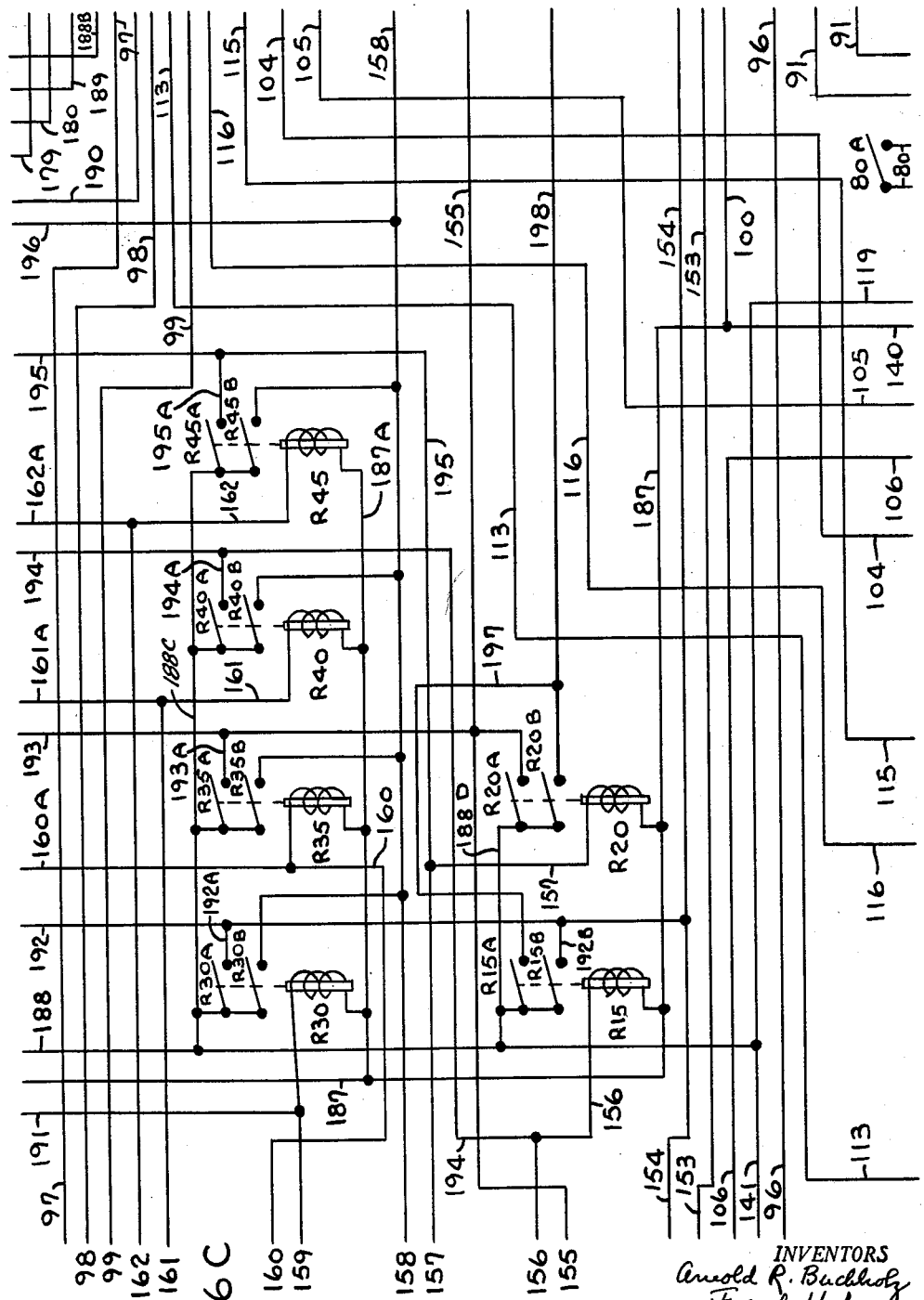

United States Patent Office 2,922,427
Patented Jan. 26, 1960

2,922,427
COIN DISPENSING MACHINE

Arnold R. Buchholz and Frank Haban, Watertown, Wis., assignors to Brandt Automatic Cashier Company, Watertown, Wis., a corporation of Wisconsin Application November 14, 1955, Serial No. 546,679

11 Claims. (Cl. 133—2)

The invention relates to coin dispensing machines.

In the usual coin dispensing machines the operation of the keys by the operator selectively operates the ejector mechanisms used in dispensing the coins which is fatiguing to the operator. To reduce the work expended by the operator in operating the machine, the main object of the present invention is to provide an electrically operated and controlled coin dispensing apparatus in which the operator controlled keyboard is a switchboard that may be mounted on the machine or disposed at a distance therefrom so that the machine may be located above or below the operator's counter and the coins can be delivered to the customer or the operator.

The application of Arnold R. Buchholz and William H. Sprenger, Serial No. 477,154, filed December 23, 1954, now Patent No. 2,864,385, for Coin Dispensing Machine, disclosed a machine which will accomplish the above described object, and one object of this invention is to improve and simplify this machine by a more compact and simplified arrangement of the ejector mechanism, an improved clutch and motor control, and an improved coin depletion control.

A further object of the invention is to provide a machine which may be controlled by the small keyboard of said prior application or by a large keyboard as hereinafter described in which the parts are so related that only a minimum number of coins are dispensed for any particular transaction.

While the machine herein shown is particularly designed to act as a coin payor, parts of the mechanism may also be incorporated in other forms of coin dispensing machines such as coin changers so that the invention is not to be limited to a coin payor type of machine unless so specified.

The invention further consists in the several features hereinafter described and more particularly defined by the appended claims.

Fig. 3 is a vertical sectional view taken on the line 3—3 of Fig. 2;

Fig. 4 is a horizontal sectional view taken on the line 4—4 of Fig. 2;

Fig. 5 is a fragmentary vertical sectional view taken on the line 5—5 of Fig. 2;

Fig. 6 is a view similar to Fig. 5 showing the parts in a different position;

Fig. 7 is a rear view of the machine with the back removed;

Fig. 8 is a detailed view of a part of the back portion of the machine showing certain switching mechanism;

Fig. 9 is a view similar to Fig. 8 showing the parts in a different position;

Fig. 10 is a vertical sectional view taken on the line 10—10 of Fig. 3;

Fig. 11 is a vertical sectional view taken on the line 11—11 of Fig. 3;

Fig. 12 is a plan view of the small keyboard;

Fig. 14 is a wiring diagram for parts in the machine;

Fig. 14A is a wiring diagram for other parts in the machine;

Fig. 15 is a wiring diagram of part of the small keyboard lined up with the diagram of Fig. 14;

Fig. 15A is a wiring diagram of other parts of the small keyboard lined up with the diagram of Fig. 14A;

Figure 16:
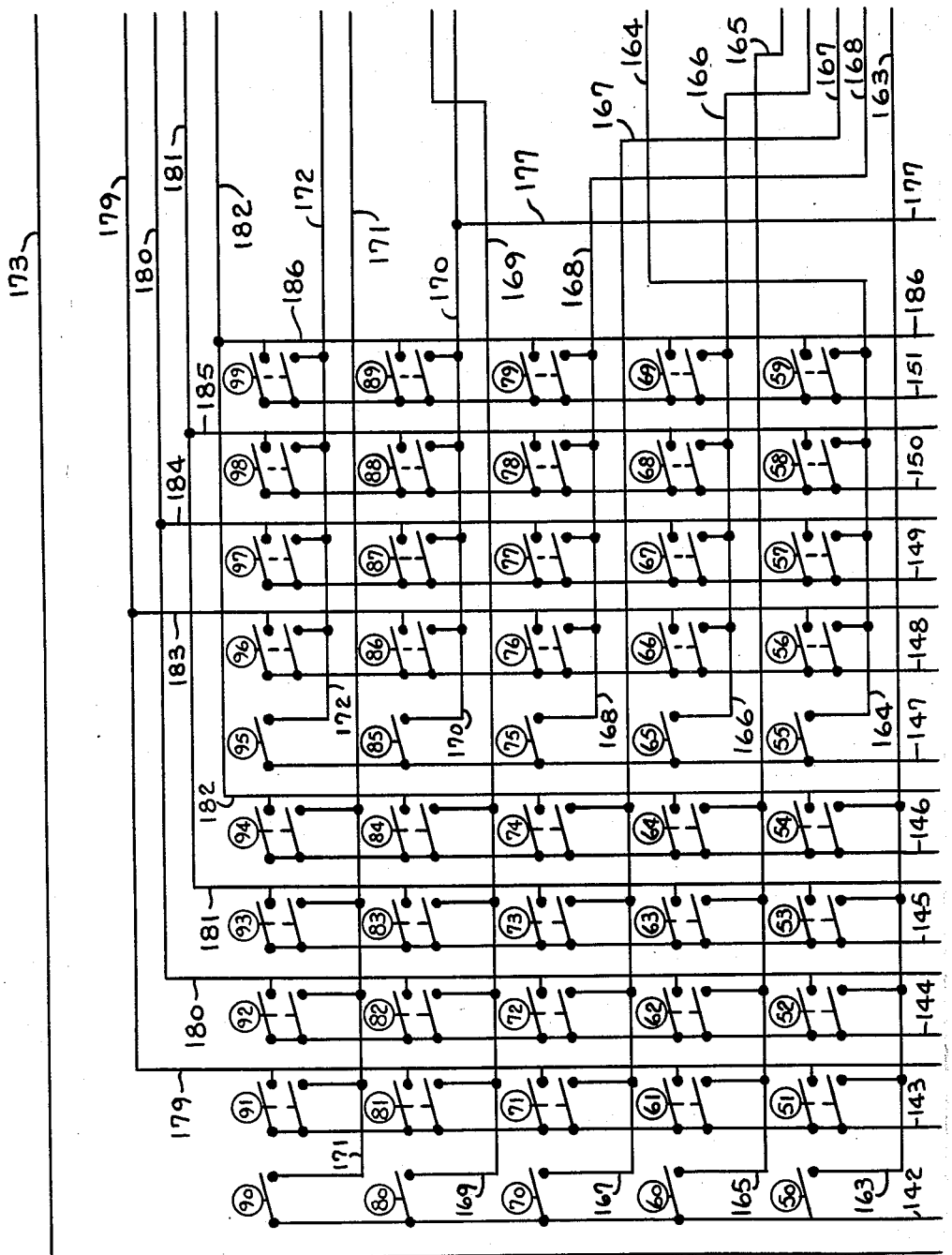
Figure 16B:
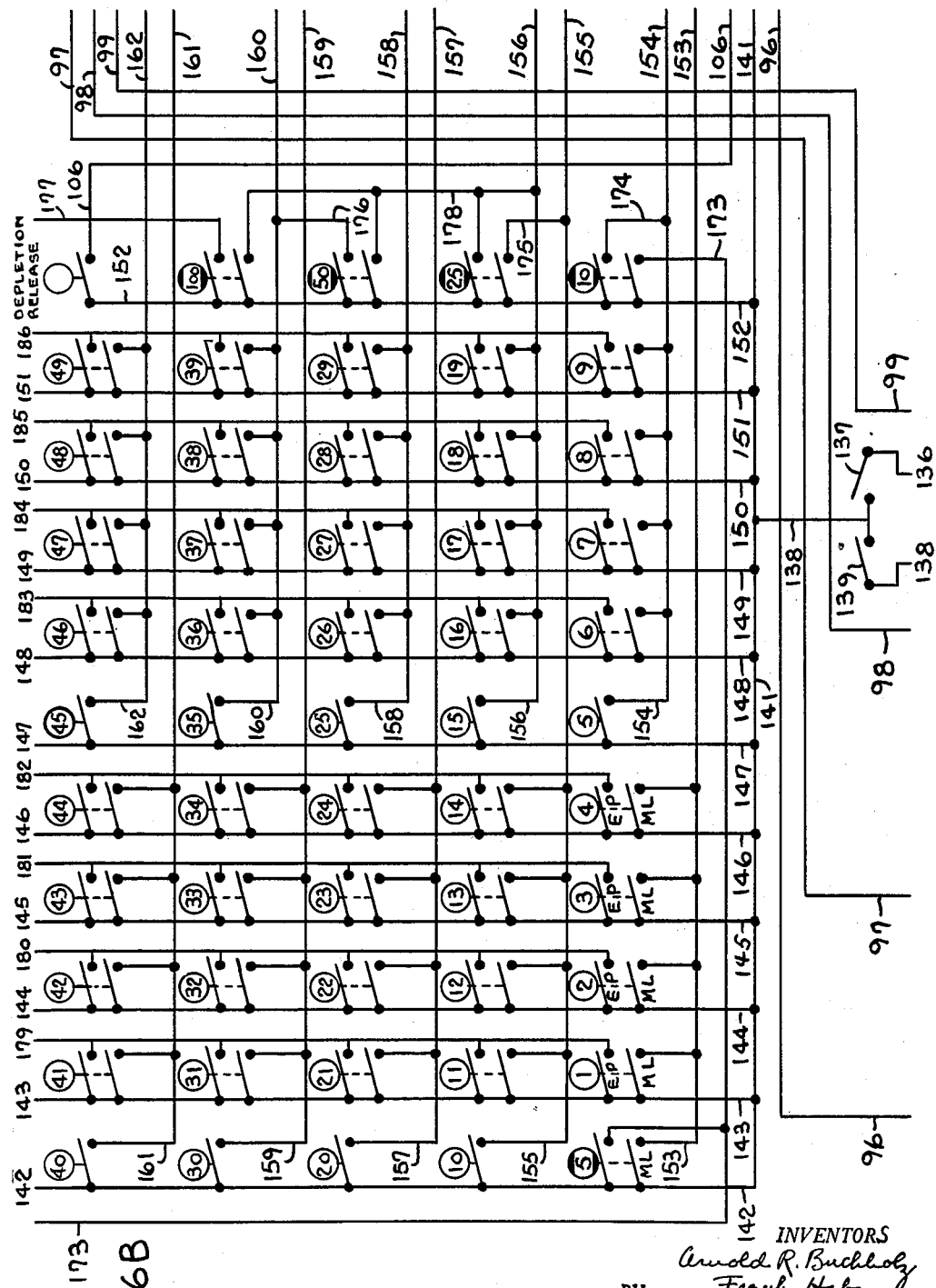

Figs. 16, 16A, 16B, 16C, and 16D are wiring and apparatus diagrams of the large keyboard of which Figs. 16B and 16C are adapted to be lined up with Figs. 14 and 14A.

Figure 1:
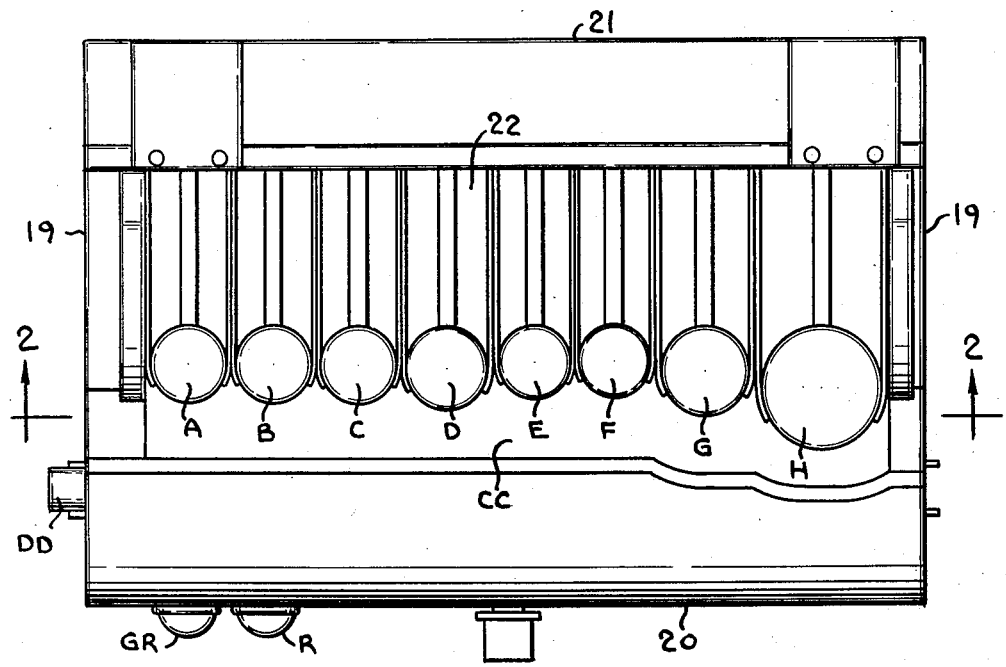
Fig. 1 is a plan view of the machine.
Figure 2:
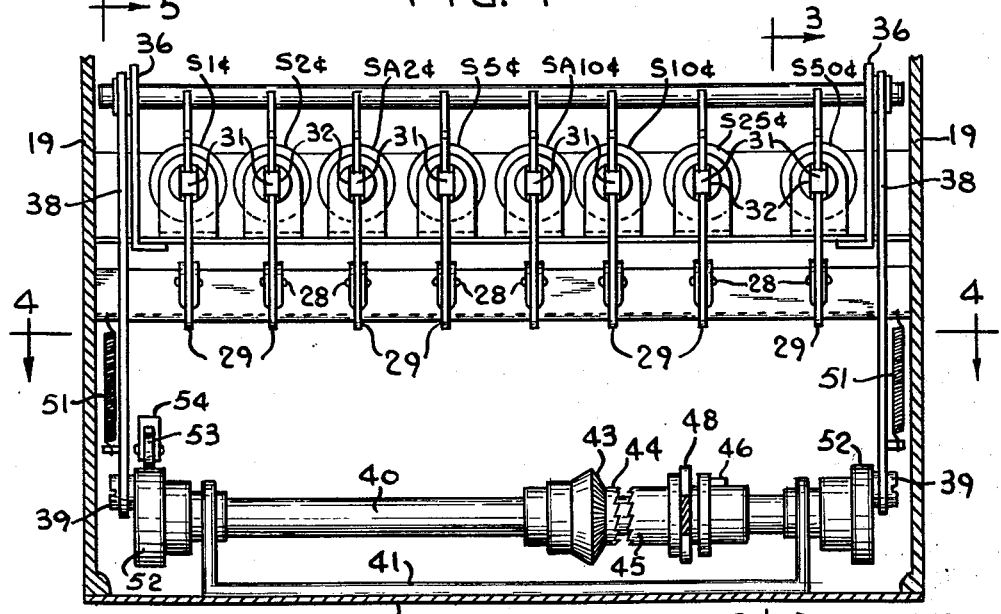
Fig. 2 is a detailed vertical sectional view taken on the line 2—2 of Fig. 1.

Referring to Figs. 1 to 3, the apparatus includes a metal housing having a base 18, sides 19, front 20, and a removable back plate 21. A coin tray 22 is suitably removably mounted at the upper portion of the housing and is formed to provide coin compartments or chutes for the various denominations of coins. The chutes A, B, and C carry pennies in stacks, the chute D carries nickels, the chutes E and F dimes, the chute G quarters, and the chute H half dollars. The ejector mechanism for chute A is adapted to eject one penny at a time therefrom, and the ejector mechanisms for the chutes B and C are adapted to eject two pennies each at a time so that either one, two, three, or four pennies can be dispensed from the machine. The ejector mechanisms for the chutes E and F are each adapted to eject one dime at a time while the ejectors for chutes D, G, and H are adapted to eject one coin at a time from each of said chutes.

The ejectors each include a coin ejection finger 23 working through a slot in the coin tray and pivotally connected at 24 to the upper arm of an ejector lever 25 pivotally mounted intermediate its ends on a transversely extending shaft 26, said finger being normally urged upwardly by a spring 27 against the upper end of said slot. The lower arm of lever 25 is pivotally connected at 28 to a push bar 29 which, by a spring 30 connecting the lower end of said bar and the lever, is normally urged against a roller 31 mounted in the front end of a slot 32 in a plunger 33 of a solenoid. The ejector operating solenoids are numeralled S1¢, S2¢, SA2¢, S5¢, SA10¢, S10¢, S25¢, and S50¢. The upper end 34 of the bar 29 is notched so that when the solenoid, such as S50¢, is energized and its plunger 33 moved toward the left as viewed in Fig. 3, the notched end of said bar will be alined with a transversely disposed reciprocatory actuating bar 35 which on its downward movement pushes down on the bar 29 which then acts to swing the lever 25 clockwise about the shaft 26 and with it the finger 23 to move said finger toward the right as viewed in Fig. 3 to eject the coin from its tray so that it may fall into a chute structure CC by which it is carried out of the apparatus.

The bar 35 works in a pair of spaced slotted brackets 36 secured to a transversely extending shelf 37 and is operatively connected at its ends to one of the ends of links 38 which are operatively connected at their other ends to eccentric cranks 39 at the end of a rotary shaft 40 journalled in the arms of a bracket 41. A partial rotation of the shaft 40 acting through the cranks 39 and the links 38 causes the bar 35 to move downwardly in the slotted brackets 36, and if the hooked or notched portion 34 of any one of the push bars 29 is then in its operating or raised position, it will be engaged by said bar 35 and moved down and thus actuate the lever 25 and the ejector finger 23 associated therewith as previously described.

The shaft 40 is driven by an electric motor M having a speed reducer R whose output shaft carries a bevel gear 42 that meshes with a bevel gear 43, loose on the shaft 40 and having a toothed clutch face 44 adapted to be engaged by the toothed face of a clutch sleeve 45 slidably keyed by a key 46 and slot 47 to said shaft. Sleeve 45 has an annular groove engaged by the forked end 48 of a shift lever 49 pivoted on the housing at 50 and pivotally connected intermediate its ends to the plunger S4A of a solenoid S4. With the motor running, the operation of the solenoid S4 acts to move the sleeve 45 into engagement with the cooperative clutch member 44 to rotate said shaft in a direction to operate the ejectors, and before a single revolution of the shaft 40 has been made, the solenoid has been cut out so that the sleeve 45 is free to move out of clutching engagement with face 44, and declutching is effected by springs 51 anchored at one end to the housing and at their other ends to the links 38, which springs are put under load on the downward ejecting movement of the bar 35 and react through said links 38 and cranks 39 to turn the shaft 40 in the same direction as that of the motor M but at a higher speed so that the clutch elements above described are released from or overrun relative to each other. The springs 51 also act to complete the return of the bar 35 to its initial upper position.

Referring to Figs. 5 and 6, the shaft 40 carries a cam 52 engaged by a roller 53 on a switch operating lever 54 pivoted at 55 on a bracket 56 that carries a key release control switch 57 that controls a key release solenoid S3 (Fig. 15A). Lever 54 until released by the cam 52 is latched in a switch open position by a latch lever 58 held in latched position by electromagnet E3 against pressure of a release spring 59.

Referring to Figs. 8 and 9, a motor control switch 60 is closed by an actuator lever 61 pivoted intermediate its ends at 62 and adapted to be moved to close the switch 60 by its attraction to an electromagnet or relay R6. Switch 60 is held in closed position by a swingable latch member 63 urged into latching engagement with a projection 64 on said lever 61 by a spring 65. At the desired time the latch member 63 is released from the lever 61 by an electromagnet 66.

Referring to Figs. 3 and 7, a coin engaging lever or finger 67 is pivotally mounted at its upper end 68 to work in a slot 69 in each chute of the tray. Each finger 67 is yieldingly held against the stack of coins by a yieldable switch actuator 70 pivoted at 71 on a lever 72 loosely mounted on a transversely disposed shaft 73. A switch 74 is mounted on the lever 72 and normally held in an open position by the actuator 70. All of the levers 72 are normally held by the spring action of their actuators 70 against a stop bar 75 forming part of a U-shaped bar whose legs are pivoted on the shaft 73, one of said legs being extended at 75A and connected to a spring 76 secured at its other end to the housing. A projection 77 at one end of the bar 75 is connected by a pin 78 to the plunger XS4A of a solenoid S4X. At the end of every payment the stop bar 75 is released from the levers 72 by the movement of the plunger XS4A by the solenoid S4X so that the actuators 70 are released from pressure engagement with their fingers 67 so that the coins in the stacks are free to drop down to bring the lower one or ones to a dispensing position. If, however, the coins in any one of the stacks should be depleted when the parts are in the position shown in Fig. 3, then the actuator 70 will act to swing the finger 67 inwardly of the stack and relieve its pressure on the switch 74 so that this switch is closed, and as hereinafter described, the closing of this switch acts to open the motor circuit.

In the dispensing of coins from the machine it may be desirable to direct the coins from the chute CC to either one of the openings BB in opposite sides of the machine. For this purpose a multipositional chute DD is mounted in the machine so that under the control of the operator it may be inclined in one direction to deliver coins through one of the side openings and in the opposite direction to deliver coins to the other of the side openings. As shown in Fig. 10 the chute is hung by pivots EE and FF to one of the ends of levers EL and FL whose other ends are respectively mounted on pivots ELL and FLL. The levers EL and FL are respectively pivotally connected intermediate their ends by pins EP and FP to links GG and HH. The links GG and HH are pivotally connected together by a pin JJ which is mounted on an operating lever OL carried by a shaft IS, journalled in the housing, and which also as shown in Fig. 11 carries a crank or lever SX that forms one arm of a toggle linkage, whose other arm TL is a rod slidably mounted in a pivot pin TP. A spring SP is interposed between said pin TP and the connection between the parts SX and TL so that when the crank SX is moved beyond vertical dead center, the spring SP will tend to break the toggle linkage. The levers EL and FL are so disposed relative to the chute DD as to have one of their sides form a support for the chute DD when in either of its inclined dispensing positions, one of these being shown in Fig. 10. For controlling the positioning of the chute DD from the operator's station at the keyboard, a pair of solenoids SSC are mounted in alined position with their plungers SSP operatively connected by links SL to the pin SLL that connects with the lever SX and the rod TL. Referring to Figs. 14 and 15, the coils for the solenoids SSC have one of their terminals connected to a conductor 135 connecting with conductor 101A. The other side of one of the coils is connected by a conductor 136 with a manually operated control switch 137 that connects with a conductor 138 connected with the conductor 101. The other side of the other solenoid is connected by a conductor 138 through a manually controlled switch 139 with the conductor 138. The conductor 101 connects by a conductor 119 (Fig. 14A) with one side of a low voltage coil 120 whose other side is conncected with conductor 101A so that when either the switch 137 or the switch 139 is closed, current will flow from the line 138 through one of these switches and their associated conductors to the line 135 and thence to the line 101A. Closing of switch 137 energizes the right hand solenoid shown in Fig. 11, and closing of the switch 139 energizes the left hand coil of the solenoid SSC, and as shown in Fig. 11 this left hand coil has been energized to move the lever SL toward the left, and in doing so its acts through the lever OL, links GG, HH, levers EL and FL to swing the chute DD to the position shown in Fig. 10. Closure of the switch 137 acts on the right hand solenoid to shift plunger SSP of the solenoid SSC toward the right and swing the lever SX over to the right hand side of the vertical, thus shifting the chute DD to the tilted dotted line position shown in Fig. 10.

Figs. 14 and 14A, 15 and 15A should be read together and form a complete wiring diagram for the parts heretofore described and certain hereinafter mentioned relays, lights, etc., that are in the machine.

Referring to Figs. 14 and 14A, the numeral 80 designates a 110 volt supply line having a hand closed switch 80A (in the keyboard) and connected by a switch RA1 of a relay R1 to conductor 80B including the coil of magnet E3. A conductor 82A leads to one terminal of the motor M. The other supply line 81 is connected by a conductor 82 to line 80B and conductor 82A and by a conductor 83 including the coil of solenoid S4 to conductor 84 and to a conductor 85 connected to the other terminal of the motor M. Energization of relay R1 shifts switch RA1 to connect line 80 with a conductor 86 connected with the movable contact 57A of switch 57 which, in its starting position, connects with a conductor 87 leading to the motor control switch RA5 of a relay R5 which is connectible by a conductor 88 with conductor 84. Conductor 87 is also connected by a conductor 89 with one contact of a motor control switch 60 whose other contact is connected by a conductor 90 with conductors 84 and 88. Conductors 125 and 81A connect the primary of a transformer T across the lines 80 and 81.

In its shifted position contact 57A connects conductor 86 with a conductor 91 that includes the coil of solenoid S3 (in the keyboard) and connects with the supply line 81. One terminal of the coil of solenoid S4 is connected by a conductor 92 to a conductor 81A and by a conductor 93 to one terminal of the coil of relay R7. The outer terminals of these coils are connected together by a conductor 94. The coil 95 of electromagnet 66 is connected across the conductors 93 and 94.

One terminal of each of the coils of solenoids S1¢, S2¢, SA2¢, S5¢, SA10¢, S10¢, S25¢, and S50¢ is connected to a common conductor 96 which includes the coil of relay R1. The other terminals for the above named solenoids are respectively connected to conductors 97, 98, 99, 100, 102, 103, 104, and 105.

A conductor 106 connects with conductor 101A and includes the coil of relay R6 and is connected with one terminal of the coil R5. A conductor 107 connects conductor 80 with conductor 94.

One of the terminals of the coils of relays R2, R3, and R4 are connected to conductor 101A. The other terminal of relay R2 coil is connected to a conductor 108. The other terminals of coils of relays R3 and R4 are connected together by a conductor 109 which connects with a conductor 110 and a conductor 111 connected to switch member RC4 of relay R4 adapted to be connected by conductor 112 with conductor 104. Conductors 108A and 103 are adapted to be connected together by conductor 108A, switch member RB2 of relay R2, and a conductor 103A.

A conductor 113 connects with switch member RA2 of relay R2 whose other terminal is connected by a conductor 114 with switch member RA3 whose other terminal connects with conductor 100. A switch member RA4 of relay R4 connects conductor 103 with a conductor 115 and a switch member RB4 of relay R4 connects conductor 102 with a conductor 116.

A conductor 117 including the coil of relay R5 is connected to conductor 106 and through switch arm RA7 of solenoid R7 with a conductor 118. One of the terminals of each of the coin depletion switches 74 is connected to the conductor 118. Each of the other terminals of these switches is connected to a conductor 119. The lines 119 and 106 are supplied with low voltage current through connection therewith of the coil 120 of the transformer T.

Figure 13:
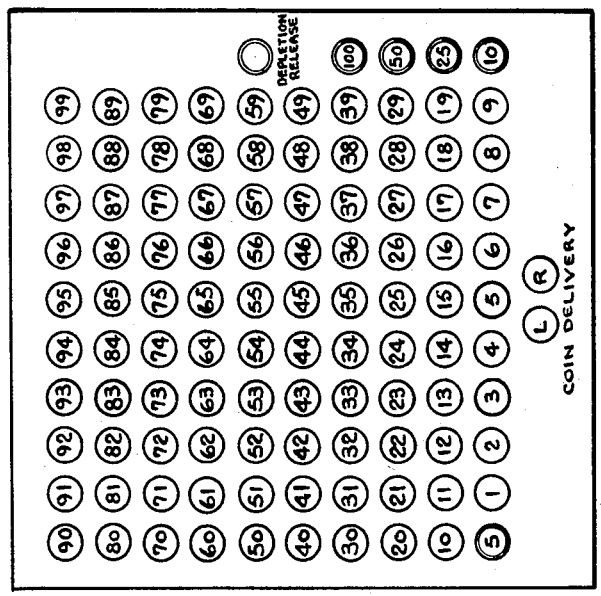
Fig. 13 is a plan view of the large keyboard.

Conductor 81A connects by conductors 121 and 122 with one of the terminals of a green light GR and a red light R. The other terminal of the green light is connected by a conductor 123 with the switch member RB5 and with a conductor 124. The other terminal of the red light is connected to a conductor 126. A light control switch member RA6 of relay 6 connects a conductor 127 either with the conductor 124 or with a conductor 128 which connects with a light control switch member RB5 that is adapted to connect this conductor with either the conductor 123 or 126. The conductors 96, 97, 98, 99, 110, 108, 113, 116, 115, 104, 106, 119, parts of line 80, and parts of conductor 91 are extended beyond the machine as an assembled cable for connection with either the small keyboard shown in Fig. 12 or with the large keyboard shown in Fig. 13.

Figure 12A:
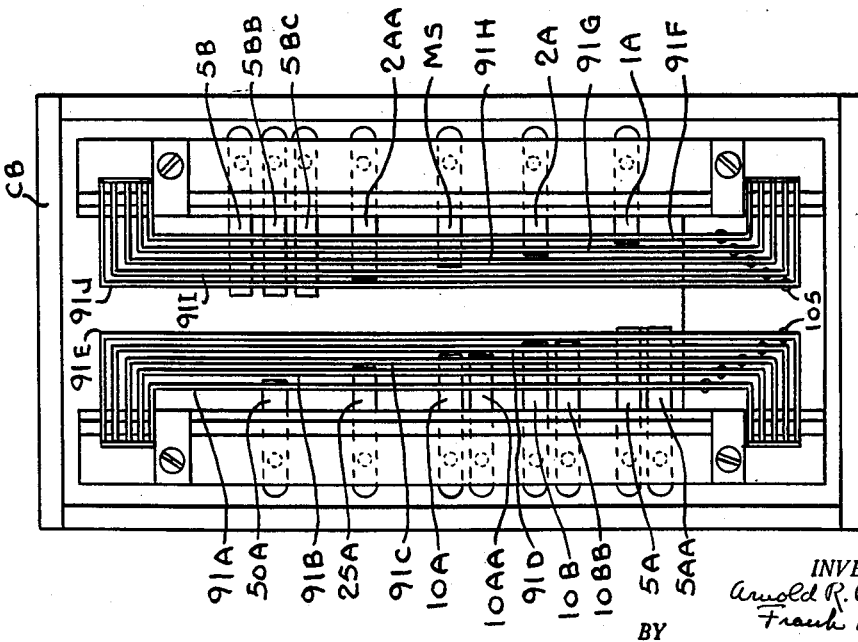
Fig. 12A is a horizontal sectional view through the small keyboard showing the switch operating bars.

The small keyboard is similar in construction to that shown and described in detail in the copending application Serial No. 477,154, filed December 23, 1954, previously mentioned, and includes two sets of keys, sets of switch operating bars operated by said keys and the switches operated thereby, the keys being so constructed that they operate one or more of the operating bars to operate one or more of the switches that control the conductors above referred to so that the least number of coins will be dispensed for any particular total of 1¢ to 99¢. The operating bars are shown in Fig. 12A, but the keys and the switches that they operate and their connections with the conductors noted above and their latch releases have been diagrammatically shown in Figs. 15 and 15A.

Referring to Figs. 12, 15, and 15A, the small keyboard has two rows of keys, the first row being tens keys numbered 1 to 9 and the second row having digit keys 1 to 9 and a 0 key. The keys are of the type spring urged to inoperative position and provided with a locking notch adapted to be engaged by a latch finger to hold it in its operative position but adapted to be released by operative connection with a suitable solenoid. In the present instance, the latching mechanism has been shown diagrammatically as a projection 127 on each key and a series of latches 128 operatively connected to a common release actuator L including the plunger of the solenoid S3.

The keys with their actuating bars are arranged to operate switches MS, 1A, 2A, 2AA, 5B, 10B, 10A, 25A, 50A, and a switch DR. One terminal of all these switches is connected to a conductor 101. Conductor 101 is connected by switch MS with conductor 96, by switch 1A with conductor 97, by switch 2A with conductor 98, by switch 2AA with conductor 99, by switch 5B with a conductor 129, by switch 5A with a conductor 113, by switch 10B with conductor 116, by switch 10A with conductor 115, by switch 25A with conductor 104, and by switch 50A with conductor 105. In addition to the above switches change over switches 5BB, 5BC operable with 5B, 5AA operable with 5A, 10BB operable with 10B, and 10AA operable with 10A are provided.

Switch 5AA connects at one side with conductor 101 and is adapted to connect with a conductor 130 connected with switch 5BB whose other terminal connects with the conductor 108. Conductor 110 connects through switch 5BC with a conductor 131 that may be connected by switch 10BB with a conductor 132 that may be connected through switch 10AA with conductor 101.

With the parts in the position shown, the current supply switch 80A is closed and current passes through line 80 to switch member RA1 of relay R1, conductor 80B, coil of electromagnet E3, conductor 82 to the return line 81, thus releasing latch 58 from holding engagement with lever 54. Under these conditions while conductors 82A, 83 and 85 connect with the solenoid S4 and the motor M, the combined resistances of these parts cuts down the current supply to them so that they are not operated, but the transformer T is operating through conductors 125 and 81A to supply low voltage current to the coil 120.

The switch MS is operated by the operation of any one of the digit keys 1 to 9 or the 0 key, and when so operated, energizes the relay R1, the circuit being coil 120, conductor 119, conductor 101, switch MS, conductor 96 including relay R1, conductor 101A to the other side of the coil 120.

With relay R1 energized, switch member RA1 connects line 80 with conductor 86 so that line current now flows to switch member 57A to conductor 87 through motor switch RA5 of relay R5, conductor 88, conductor 84, coil of clutch solenoid S4, conductor 83 to the other supply line 81 and also flows from conductor 84 to conductor 85 through the motor M and then through conductors 82A and 82 to said line 81.

With the clutch engaged and the motor M running, the shaft 40 is turned to operate bar 35 and through it the ejector mechanism for any one of the trays. Assuming, for example, that switch MS has been closed by the operation of the digit key 1, then low voltage current also passes from coil 120, conductor 119, conductor 101, switch 1A, conductor 97, coil solenoid S1¢, conductor 96, conductor 101A to the other side of the coil so the lever 29 is in a position for engagement with the bar 35 as the same is moved downwardly by the motor and ejection of coins from the tray A follows. Near the end of the return stroke of the links 38, the cam 52 moves the actuator 54 upwardly to shift switch member 57A from conductor 87 to connect line 80, switch RA1, conductor 86 to conductor 91 that includes latch release solenoid S3, and then to return conductor 81, thereby energizing solenoid S3 to release the latches 128. At the same time current from conductor 80 passes through conductor 107 to conductor 94 and from thence through the coils of solenoids S4, R7, and electromagnet 66 to conductors 93, 92, and 81A to the return line 81. Energization of solenoid S4 acting through the stop bar 75 releases pressure of actuator 70 on the finger 67 so that coins will move down in the stack without binding. Energization of magnet 66 releases the latch 63 from the actuator 61, and energization of solenoid SR7 of relay R7 moves switch member RA7 to open position.

As soon as solenoid S3 operates, the keys are released so that switches MS and 1A are opened. Opening of switch 1A deenergizes solenoid S1¢. On opening switch MS, relay R1 is deenergized, and switch member RA1 breaks the circuit between conductors 86 and 80 and connects conductor 80 with 80B to again energize electromagnet E3 so that the actuator 54 can be released from latch 58 in the position shown in Fig. 6 and be again locked by this latch in the position shown in Fig. 5, whereupon switch 57 is through 57A then moved back into contact with conductor 87, thereby opening the circuit to solenoids S3, S4, coil of magnet 66, and relay R7.

Should the coins in any one of the trays become depleted so that one of the fingers 67 can move into its tray to release pressure on its associated actuator 70, its switch 74 is closed and current from coil 120 passes via conductor 119 through this switch 74 to conductor 118, switch RA7, conductor 117 to the coil of relay R5, conductor 106 back to the coil 120. Energization of relay R5 moves switch member RA5 to open the motor circuit so no further delivery of coins can be had. The operator, however, can by operating switch DR close a circuit through relay R6 to again temporarily establish a circuit through the motor M to make one payment. Closing switch DR allows current to flow from coil 120 to conductor 119, switch DR, conductor 106 to the other side of coil 120 to energize relay R6 so that switch 60 then connects conductors 87 and 89 with conductors 90 and 84 so that when the operator pressing down on the number 1 digit key closes switches MS and 1A, relay R1 and solenoid S1¢ will be again energized to position the ejector of the tray A. Under these conditions switch RA1 again connects line 80 to conductor 86 through switch 57A with conductor 87 and current passes through conductor 89, switch 60, conductors 90, 84, 85, 83, 82A, and 82 to again connect the motor M and clutch coil S4 to the return line 81, and the dispensing cycle is repeated as previously described. As soon as the operator releases the switch DR, the circuit to the coil of relay R6 is opened, but switch 60 is held closed by the latch 63 until at the end of the cycle magnet 66 is energized to release the latch from engagement with actuator 61.

Closing of switch 80A supplies current from line 80, conductor 125, conductor 127, switch member RA6, conductor 128, switch member RB5, conductor 123, the green light, conductors 122, 121, and 81A to the return line 81. When as we have seen due to coin depletion, relay R5 is energized, switch RB5 moves from conductor 123 (cutting out the green light) to conductor 126 so that current from line 80, conductor 125, conductor 127, switch member RA6, conductor 128 can pass via RB5 to conductor 126, the red light, conductors 122, 121, and 81A to the return line.

When as heretofore described the switch DR is operated to energize relay R6, then switch member RA6 shifts from conductor 128 to conductor 124 to connect the green light in circuit while the relay R6 is energized and motor switch 60 is closed.

At the end of the cycle relay S4 is energized and acts to close switch 74 in the same manner that the depletion of the stack of coins would close 74 and as the closing of switch 74 would normally operate relay R5 causing the green light to change to red the operation of relay R7 at the same time that relay S4 is energized opens the switch RA7 to open the circuit from switch 74 to relay R5 and, therefore, switch RB5 is not moved to its other position and the green light does not change to red as it would ordinarily do if the coins were depleted so that the relay R7 prevents blinking of the signal lights at the end of each payment.

Instead of using a transformer and low voltage circuits to certain of the parts heretofore mentioned, the transformer may be omitted and the conductors 119 and 101 be connected to the conductors 81A and 125 without departing from the invention.

While as previously noted a keyboard similar to that herein shown and its details of construction have been shown in the prior application Serial No. 477,154, in order that a clear understanding of the use of the small keyboard of this application may be had, we have shown in Fig. 12A the arrangement of the key operated actuating bars or levers that operate the switches MS, 1A, 2A, 3AA, 5B, 5A, 10B, 10A, 25A, 50A.

There are a set of actuating bars for each row of keys of the small control panel or keyboard. Each bar is of U-shape having its legs pivotally mounted in the panel and normally urged to a release or inoperative position by suitable means such as the spring actuated pin of the prior application. The first lever 91A of the first row of keys controls the switch 50A for the S50¢ solenoid, the second lever 91B controls the switch 25A for the S25¢ solenoid; the third lever 91C controls the switch 10A for the S10¢ solenoid and the switch 10AA, the fourth lever 91D controls switch 10B for the solenoid SA10¢ and the switch 10BB, and the fifth bar 91E controls switches 5A and 5AA.

The first bar 91F for the second row of keys controls a switch 1A for the solenoid S1¢, the second bar 91G controls the switch 2A for the solenoid S2¢, the third bar 91H controls switch MS, the fourth bar controls the switch 2AA for the solenoid SA2¢, and the fifth bar 91J controls the three switches 5B, 5BB, and 5BC.

In the general description of the dispensing mechanism we referred to the ejection of 1¢ by the closing of the switches MS and 1A. This is accomplished by the operator's pressing down the key numbered 1 of the second row of keys which has a foot portion adapted to depress the bars 91H and 91F to thereby close the switches MS and 1A and accomplish the operations previously described. The other digit keys 2 to 9 also designed to operate the bar 91H to actuate the motor switch MS in addition to one or more switches and the zero key also operates this bar 91H.

When the number 2 key in the second row is depressed, bars 91H and 91G are depressed closing switches MS and 2A, and the same events take place as explained heretofore except that the solenoid S2¢ is energized from current passing from feeder lines 119 and 101 through switch 2A, conductor 93, conductor 96 to the return feeder 101A. Then as the motor M is operated, the ejector mechanism for the first 2¢ tray B will be operated to deliver two pennies.

Depressing the number three key acts to depress bars 91F and 91I to operate switches 2AA and 1A and also bar 91H for switch MS, and the same events take place as heretofore explained except that solenoids SA2¢ and S1¢ are energized so that in addition to current passing to solenoid S1¢ as heretofore explained, current passes also from conductor 101 through switch 2AA, conductor 99, solenoid SA2¢, conductors 96 and 101. Then as the motor is operated, the ejector mechanisms for trays A and C will be operated to deliver three pennies.

When the number four key is depressed, the bars 91G and 91I operate switches 2A and 2AA and also bar 91H for switch MS. Current then passes to solenoids S2¢ and SA2¢ as heretofore explained, and the motor is operated as previously explained to dispense 2¢ from each tray B and C.

When the number 5 key is depressed, the bar 91J operates switch 5B and also bar 91H for switch MS. Current then passes from feeder 101 through switch 5B, conductors 129, 113, switch RA2 of relay 2, conductor 114, switch RA3 of relay R3, conductor 100, solenoid S5¢, conductors 96 and 101. Then as the motor is operated, the ejector mechanism for tray D will be operated to deliver a nickel. While switches 5BB and 5BC are also operated, since other parts in circuit therewith are open, their closing has no effect.

Depression of the keys 6 to 9 of the digit keys in each instance acts to depress the bar 91J to close the switch 5B and to depress the bar 91F and close switch 1A for six cents, the bar 91G and close switch 2A for seven cents, bars 91I and 91F and close switches 2AA and 1A for eight cents and the bars 91G and 91I and close switches 2AA and 2A for nine cents, the solenoids controlled by the above named switches and the motor acting to dispense the coins.

For paying 10¢ the number 1 key of the first row and the zero key of the second row are depressed in that order, depressing bars 91D and 91H to close first switch 10B and then switch MS. Closing of switch 10B energizes solenoid SA10¢, the circuit being conductor 101, switch 10B, conductor 116, switch member RB4 of relay R4, conductor 102, solenoid SA10¢, conductor 102 and 101A, and then when the zero key is depressed to close switch MS, the motor M operates as previously described to actuate the ejector mechanism for tray E to dispense 10¢, closing of switch 10BB having no effect.

For dispensing 11¢ to 19¢ the operation is identical to that for 10¢, the only difference being that instead of pressing the zero key, the operator presses one of the keys 1 to 9 in the second row for the amount desired to be dispensed, and as we have seen in taking up each one of the keys of the second row individually that they will dispense an additional 10¢ to make up the amount desired.

For dispensing 20¢, the operator actuates the number 2 key of the first row to depress bars 91C and 91D to close switches 10A and 10B. Closure of switch 10B operates as previously described to deliver ten cents from tray E. On closing switch 10A current from line 101 passes through conductor 115, relay switch member RA4, conductor 103, solenoid S10¢, conductors 96 and 101A to deliver ten cents from the tray F so that when the zero key is depressed and switch MS operated, the parts will function to eject coins from each of the 10¢ trays, the closing of switches 10AA and 10BB having no effect.

For 21¢ to 24¢ the operation is the same except instead of pressing the zero key, the keys 1 to 4 of the second or digit row are depressed depending upon the amount desired.

For dispensing 25¢ the operator presses the number 2 key of the first row to close switches 10A, 10AA, 10BB, and 10B, and as has been described for the 20¢ operation solenoids S10¢ and SA10¢ will be energized, but when the operator depresses digit key 5, current then flows from conductor 101, switch 10AA, conductor 132, switch 10BB, conductor 131, switch 5BC, conductors 110, 109, coils of relays R4 and R3 so that switches RA4 and RB4 are cut out, switch RC4 is connected to conductor 112 and switch RA3 is cut out so current from conductor 110 passes through conductor 111, switch RC4, conductor 112, 104 coil of solenoid S25¢, conductors 96 and 101A, and the pusher bar for the 25¢ is set and the motor switch MS closed as previously described to operate the ejector mechanism for the tray G to dispense 25¢.

For 26¢ to 29¢, the operation is the same as that for 25¢ except that after pressing the number 2 key of the first row, the digit keys 6 to 9 are depressed depending upon the pennies to be added to 25¢ to make up the amount desired.

For dispensing thirty cents, the number 3 tens key is depressed moving bars 91B and 91E to close switches 25A, 5A, and 5AA. Closing switch 25A establishes current flow from conductor 101 through switch 25A, conductor 104, coil of solenoid S25¢, conductors 96 and 101A to position the push bar of the tray G, and closure of the switch 5A as we have seen positions the push bar for the nickel tray D so that depressing of the zero key causes the motor to operate, the positioned push bars to dispense 25¢ from the tray G and 5¢ from the tray D.

For 31¢ to 34¢, the operation is the same as that above described except that in addition to the paying out from the 25¢ and 5¢ trays the depression of the keys 1 to 4 of the second row will cause the corresponding addition of pennies to the 30¢ to make up the amount desired.

For dispensing 35¢, the number 3 tens key is depressed, moving levers 91B and 91E to close switches 25A, 5A, and 5AA the same as in dispensing 30¢, but when the 5 key of the second row is operated, then the switches 5B, 5BB, and 5BC are closed with the result that current can now flow from the line 101, through switch 5AA, conductor 130, switch 5BB, conductor 108 to energize the coil of relay R2 so that the switches RA2 and RB2 are shifted causing the S5¢ solenoid to be disconnected and throwing in the solenoid SA10¢ since current can now pass through conductor 108, switch RB2, conductor 103A, conductor 103, coil of solenoid S10¢, conductors 96 and 101A.

For 36¢ to 39¢ the action is the same as for 35¢ except that in depressing the digit keys 6 to 9, respectively, the pennies corresponding to the additions to 35 are added to make up the amount desired.

For dispensing 40¢, depressing of the tens key 4 depresses the bars 91B, 91D, and 91E to close switches 25A, 10A, and 5A so that, as previously described, the circuits are established through the solenoids S25¢, S10¢, and S5¢, and then when the zero key of the second row is depressed to establish current flow through the motor, the push bars for the ejectors are positioned by these solenoids to dispense 25¢ from the 25¢ tray, 10¢ from one of the dime trays, and 5¢ from the nickel tray.

The dispensing of 41¢ to 44¢, respectively, is similar to the 40¢ operation except that the additional digits or pennies are added to the 40¢ by the selective operation of the keys 1 to 4, respectively.

For 45¢ the tens key 4 is depressed as before operating switches 25A, 10A, and 5A. This connects the solenoids S25¢ and SA10¢ across the lines and also the solenoid S5¢, but when the digit key 5 is operated, the switches 5B, 5BB, and 5BC are closed, and the closing of switch 5BB establishes current flow from conductor 101, switch 5AA, conductor 130, switch 5BB, conductor 108 to the coil of relay R2 to shift the switch RB2 to connect conductor 108A with conductor 103A and cut out the connection of RA2 with conductor 113 so that the coil of solenoid S5¢ is deenergized and the coil of solenoid S10¢ is energized whereby 25¢ is dispensed from the 25¢ tray and 10¢ each from each of the 10¢ trays.

For dispensing amounts from 46¢ to 49¢ the action is similar to that for 45¢ except that in depressing the digit keys 6 to 9 additional pennies are added so as to form the desired amount.

For 50¢ the tens key 5 is depressed to operate lever 91A to close the switch 50A so that current from the line 101 passes through conductor 105 to the solenoid S50¢, conductor 96 to the return conductor 101A to energize this solenoid and set its pusher bar 33 in operative position so that when the zero key of the second row is depressed, the motor and the ejector mechanism will operate to deliver 50¢ from the 50¢ tray H.

For dispensing amounts of 51¢ to 59¢ the operation is the same as for the 50¢ except in addition to the operation of the solenoid S50¢, the S1¢, S2¢, or S5¢ solenoids previously described will be operated by the depression of the keys 1 to 9, as in the dispensing of 1¢ to 9¢ as previously described to which is added the dispensing of the additional 50¢ through the S50¢ solenoid.

For dispensing 60¢, the tens key 6 is depressed, which closes switch 50A and switch 10B which we have seen energizes the solenoids S50¢ and SA10¢ and then on the operation of the zero key of the second row the motor circuit is closed and the dispensing of 50¢ from the tray H and 10¢ from the tray E follows.

For dispensing 61¢ to 69¢ the same operation occurs as for the 51¢ to 59¢ except that in addition to the 50¢ and the 10¢ additional amounts of pennies or a nickel are added to make up the desired amount, it being understood that in each instance only the pennies are dispensed up to 4¢.

The dispensing of 70¢ is similar to 60¢ except that in depressing the tens key 7 both of the switches 10A and 10B are operated in addition to the switch 50A so that each of the 10¢ solenoids and the 50¢ solenoid will act as previously described when the zero key of the second row is depressed to permit the dispensing of 70¢.

Using the tens key 7 as a basis in dispensing 71¢ to 74¢ is similar to dispensing 70¢ except that instead of operating the zero key the appropriate digit key of 1 to 4 is operated to produce the desired amount.

For dispensing 75¢ the tens key 7 is depressed which acts to close the switches 50A, 10A, and 10B and then on the operation of the digit key 5 the switches 5B, 5BB, and 5BC are closed, and as a result and similar to the operation of the dispensing of 25¢ this acts to cut out the two 10¢ solenoids SA10¢ and S10¢ that would otherwise be energized and also to cut in the S25¢ solenoid so that in addition to the 50¢ dispensed by the energization of the solenoid S50¢ on the closing of the switch 50A, 25¢ will be dispensed from the tray G.

As before amounts from 76¢ to 79¢ are obtained by adding to the 75¢ amount the digit amounts 1 to 4 through the selective depression of the second row keys 6 to 9.

For 80¢ depressing of the tens key 8 closes the switches 50A and 25A and the switch 5A so that the solenoids S50¢, S25¢, and S5¢ are energized through circuit connections which have been previously described to deliver the respective amounts from the chutes associated with these solenoids.

For dispensing 81¢ to 84¢ the penny amounts are added to the 80¢ amount by the respective depression of the keys 1 to 4 of the second row to dispense the amount desired.

For 85¢ the 8 digit key closes switches 50A, 25A, and 5A which as before energizes the solenoids S50¢ and S25¢ and then temporarily energizes the solenoid S5¢, but this is immediately cut out when the digit key 5 of the second row is depressed closing the switch 5BB so that current from the line 101 can pass through the switch 5AA, conductor 130, switch 5BB, conductor 108 to the coil of relay R2 to throw the switch RB2 to connect conductors 108A connected with conductor 108 to connect with conductors 103A, 103, coil of solenoid S10¢, conductors 96 and 101A so as to energize this 10¢ solenoid coil at the same time cutting out the 5¢ solenoid from operation so that 50¢, 25¢ and 10¢ will be dispensed from the machine.

For 86¢ to 89¢ the penny additions are made to the 85¢ dispensing in the same way as before by the addition of the additional pennies through the operation of the keys 6 to 9 of the second row to 85¢ to make up the amount desired.

For dispensing 90¢ the operator depresses the number 9 tens key to close the switches 50A, 25A, 10A, and 5A, thereby energizing the solenoids S50¢, S25¢, S10¢, and S5¢ since the circuits are then in direct connection with the coils of these solenoids so that 90¢ will be delivered by the machine when on depressing of the zero key the motor is operated.

For amounts of 91¢ to 94¢ the same action as with the 90¢ operation occurs but with the addition of additional pennies through the selective operation of the digit keys 1 to 4.

For dispensing 95¢ the action is the same as the combined action as previously described for dispensing 50¢ and 45¢ and is accomplished by depressing of the 9 tens key and the 5 digit key.

For 96¢ to 99¢ the pennies to the desired amount are added to the 50¢, 25¢, and two 10¢ deliveries by pressing down on one of the keys 6 to 9 of the second or the digit row which will give the desired amount.

It is to be noted that the relay R1 provides a time delay between the time that the motor switch MS is operated by one of the keys in the tens row before the motor switch RA5 becomes effective to establish a flow of current to the motor so that the pusher bars of the ejector mechanisms are set before the motor is started, and this relay together with the switch 57A and its associated mechanism acts to bring about the desired sequence of operations of the motor switch RA5.

Where low voltage current is used for the large keyboard, a supply conductor 140 connects with the return side of the coil 120. For the large keyboard, the lines 110 and 108 are not used so that the coils of relays R2, R3, and R4 are not used.

The large keyboard is shown in Fig. 13 and Figs. 16, 16A, 16B, 16C, and 16D are wiring and apparatus diagrams of this keyboard. Figs. 16B and 16C are adapted to be lined up with Figs. 14 and 14A. Fig. 16 lines up vertically with Fig. 16B and horizontally with Fig. 16A. Fig. 16A lines up vertically with Fig. 16C. Fig. 16C lines up horizontally with Figs. 16B and 16D.

The large keyboard has operator controlled switch operating keys 1 to 99 and may also have special keys 5¢, 10¢, 25¢, 50¢, and $1.00 key (shaded in the drawing) and a depletion release key. The special keys 5, 10, 25, 50, and 100 and all of the regular keys except those ending in zero or five have an ejector positioning switch EP and a motor control switch ML.

The current supply line 119 connects with a conductor 141 from which lead a series of vertically indicated conductors 142 to 152, respectively. A cross conductor 153 connects with the fixed terminals of the motor, the special 5¢ switch, and the fixed terminal of the motor switch ML of the keys 1, 2, 3, and 4. A cross conductor 154 connects with the fixed terminal of the 5 key switch and the fixed terminal of the motor switches ML of the keys 6, 7, 8, and 9 and through conductor 174 with the fixed terminal of the ejector positioning switch EP of the special key 10. A cross conductor 155 connects with the fixed terminal of the 10 key and the fixed terminal of the motor switch ML of the keys 11, 12, 13, and 14. A cross conductor 156 connects with the fixed terminal of the 15 key switch and the fixed terminal of the motor switches ML of the keys 16, 17, 18, and 19. A cross conductor 157 connects with the fixed terminal of the key 20 and the fixed terminal of the motor switches ML of the keys 21, 22, 23, and 24. A cross conductor 158 connects with the fixed terminal of the key 25 and the fixed terminal of the motor switches ML of the keys 26, 27, 28, and 29. A cross conductor 159 connects with fixed terminal of key 30 and the fixed terminal of the motor switches of the keys 31, 32, 33, and 34. A cross conductor 160 connects with the fixed terminal of the key 35 and the fixed terminal of the motor switches ML of the keys 36, 37, 38, and 39. A cross connector 161 connects with the fixed terminal of key 40 and the fixed terminal of the motor switch of the keys 41, 42, 43, and 44. A cross conductor 162 connects with the fixed terminal of key 45 and the fixed terminal of the motor switches of the keys 46, 47, 48, and 49.

A cross conductor 163 connects with the fixed terminal of the key 50 and the fixed terminal of the motor switches ML of the keys 51, 52, 53, and 54. A cross conductor 164 connects with the fixed terminal of the key 55 and the fixed terminal of the motor switches ML of the keys 56, 57, 58, and 59. A cross conductor 165 connects with the fixed terminal of the key 60 and the fixed terminal of the motor switches ML of the keys 61, 62, 63, and 64. A cross conductor 166 connects with the fixed terminal of the key 65 and the fixed terminal of the motor switches ML of the keys 66, 67, 68, and 69. A cross conductor 167 connects with the fixed terminal of the key 70 and the fixed terminal of the switches ML of the keys 71, 72, 73, and 74. A cross conductor 168 connects with the fixed terminal of the key 75 and the fixed terminal of the motor switches ML of the keys 76, 77, 78, and 79. A cross conductor 169 connects with the fixed terminal of the key 80 and the fixed terminal of the motor switches ML of the keys 81, 82, 83, and 84. A cross conductor 170 connects with the fixed terminal of the key 85 and the fixed terminal of the motor switches ML of the keys 86, 87, 88, and 89. A cross conductor 171 connects with the fixed terminal of the key 90 and with the fixed terminal of the motor switches ML of the keys 91, 92, 93, and 94. A cross conductor 172 connects with the fixed terminal of the switch 95 and the fixed terminal of the motor switches ML of the keys 96, 90, 98, and 99.

A conductor 173 connects with the fixed terminal of the motor switch ML of the special 10 key, the fixed terminal of the switch EP of the special 5 key and with the coil of a solenoid RL5. A conductor 174 connects the fixed terminal of the switch EP of the special 10 key with conductor 154. The fixed terminal of motor switch ML of the special 25 key is connected by a conductor 175 to conductor 155. The fixed terminal of switch EP of the special key 50 is connected by a conductor 176 to conductor 160. The fixed terminal of the switch EP of the special 100 key is connected by a conductor 177 to conductor 170. The fixed terminal of the motor switches of the special keys 100, 50, and 25 are connected to a conductor 178 connecting with conductor 156.

The pivot ends of the switches controlled by keys 90, 80, 70, 60, 50, 40, 30, 20, 10, and special 5 all connect with conductor 142. The pivot ends of the switches ML and EP controlled by keys 91, 81, 71, 61, 51, 41, 31, 21, 11, and 1 all connect with conductor 143 and the fixed terminal of switches EP controlled by these keys all connect with a vertical conductor 179. The pivot ends of the switches ML and EP controlled by keys 92, 82, 72, 62, 52, 42, 32, 22, 12, and 2 all connect with conductor 144, and the fixed terminal of switches EP controlled by these keys all connect with a vertical conductor 180. The pivot ends of the switches ML and EP controlled by keys 93, 83, 73, 63, 53, 43, 33, 23, 13, and 3 all connect with conductor 145 and the fixed terminal of the switches EP controlled by these keys all connect with a conductor 181. The pivot ends of the switches ML and EP controlled by keys 94, 84, 74, 64, 54, 44, 34, 24, 14, and 4 all connect with conductor 146, and the fixed terminal of the switches EP controlled by these keys connect with a conductor 182. The pivot ends of the switches for the keys 95, 85, 75, 65, 55, 45, 35, 25, 15, and 5 all connect with the conductor 147. The pivot ends of the switches ML and EP controlled by the keys 96, 86, 76, 66, 56, 46, 36, 26, 16, and 6 all connect with the conductor 148 and the fixed terminal of the switches EP controlled by these keys all connect with a conductor 183 connected to conductor 179. The pivot ends of the switches ML and EP controlled by the keys 97, 87, 77, 67, 57, 47, 37, 27, 17, and 7 all connect with conductor 149 and the fixed terminal of the switches EP controlled by these keys all connect with a conductor 184 connected to conductor 180. The pivot ends of the switches ML and EP controlled by the keys 98, 88, 78, 68, 58, 48, 38, 28, 18, and 8 all connect with the conductor 150 and the fixed terminal of the switches EP controlled by these keys all connect with a conductor 185 connected to conductor 181. The pivot ends of the switches ML and EP controlled by the keys 99, 89, 79, 69, 59, 49, 39, 29, 19, and 9 all connect with the conductor 152 and the fixed terminal of the switches EP controlled by these keys all connect with a conductor 186.

A conductor 187 connects conductor 140 with one of the terminals of the coils of relays R15, R20, RL3, RL4, and RL5. A conductor 187A connects conductor 187 with one terminal of the coils of relays R30, R35, R40, and R45. A conductor 187B connects conductor 187 with one terminal of the coils of relays R55, R60, R65, R70, and R75. A conductor 187C connects conductor 187 with one terminal of the coils of relays R80, R85, R90, and R95.

The other terminal of the coils of relays RL3, RL4, and RL5 are respectively connected to the conductors 181, 182A, and 173. The other terminals of the coils of relays R80, R85, R90, and R95 are respectively connected to conductors 169, 170, 171, and 172. The other terminals of the coils of relays R55, R60, R65, R70, and R75 are respectively connected to conductors 164, 165, 166, 167, and 168. The other terminals of the coils of relays R30, R35, R40, and R45 are respectively connected to conductors 159, 160, 161, and 162. The other terminals of the coils of relays R15 and R20 are respectively connected to conductors 156 and 157.

Relay RL3 controls switches R3A and R3B whose pivot ends connect with conductor 188 connected with conductor 141. Relay RL4 controls switches R4A and R4B and relay RL5 controls switches R5A and R5B and the pivot ends of all these switches connect with conductors 188. The fixed terminal of switch R3A connects by conductor 179A with conductor 179. The fixed terminal of switch R3B connects with a conductor 189. The fixed terminal of switch R4A connects by conductor 180A with conductor 180. The fixed terminal of switch R4B connects by conductor 189A with conductor 189. The fixed terminal of switch R5A connects with conductor 182 and fixed terminal of switch R5B connects by conductor 179B with conductor 179.

Relay R80 controls switches R80A and R80B whose pivot ends are connected by conductor 188A with conductor 188. Relay R85 controls switches R85A and R85B, relay R90 controls switches R90A and R90B and relay R95 controls switches R95A and R95B, and the pivot ends of all those switches connect with conductor 188A. The fixed terminals of switches R80B, R85B, R90B, and R95B are all connected to a conductor 190 connected with conductor 163. The fixed terminal of switch R80A is connected by a conductor 191 with conductor 159. The fixed terminal of switch R85A connects by conductor 160A with conductor 160. The fixed terminal of switch R90A connects by conductor 161A with conductor 161. The fixed terminal of switch R95A connects by conductor 162A with conductor 162.

Relay R55 controls switches R55A and R55B whose pivot ends are connected by conductor 188B with conductor 188. Relay R60 controls switches R60A and R60B, relay R65 controls switches R65A and R65B, relay R70 controls switches R70A and R70B, and relay R75 controls switches R75A and R75B, and the pivot ends of all these switches connect with conductor 188B. The fixed terminals of switches R55B, R60B, R65B, R70B are all connected with conductor 163 and that of switch R75A with conductor 190. The fixed terminal of switch R55A is connected by a conductor 192 with conductor 154. The fixed terminal of switch R60A connects with a conductor 193. The fixed terminal of switch R65A connects by conductor 155 by conductor 194 with conductor 156. The fixed terminal of switch R70A connects by conductor 195 with conductor 157. The fixed terminal of switch R75B connects by conductor 196 with conductor 158.

Relay R30 controls switches R30A and R30B whose pivot ends are connected by conductor 188C with conductor 188. Relay R35 controls switches R35A and R35B, relay R40 controls switches R40A and R40B, and relay R45 controls switches R45A and R45B, and the pivot ends of all these switches connect with conductor 188C. The fixed terminals of switches R30B, R35B, R40B, and R45B are all connected with conductor 158. The fixed terminal of switch R30A connects by conductor 192A with conductor 192. The fixed terminal of switch R35A connects by conductor 193A with conductor 193. The fixed terminal of switch R40A connects by conductor 194A with conductor 194. The fixed terminal of switch R45A connects by conductor 195A with conductor 195.

Relay R15 controls switches R15A and R15B and relay R20 controls switches R20A and R20B, and the pivot ends of all these switches are connected by a conductor 188D with conductor 188. The fixed terminal of switch R15A is connected by a conductor 197 with a conductor 198. The fixed terminal of switch R15B connects by conductor 192B with conductor 192. The fixed terminal of switch R20A connects with conductor 193, and the fixed terminal of switch R20B connects with conductor 198.

Referring to Fig. 16D, there are a series of latchable relays S50L, S25L, S10L, S10X, S5L, S2L, SB2, S1L, and SML. Relay S50L controls switches 50A and 50B whose pivot ends connect by conductor 199 with conductor 188B. The fixed terminal of switch 50A connects with conductor 105. The fixed terminal of switch 50B connects by a conductor 200 with the extended end of conductor 96.

Relay S25L controls switches 25A and 25B whose pivot ends connect by conductor 201 with conductor 188B. The fixed terminal of switch 25A connects with conductor 104, and the fixed terminal of switch 25B connects with conductor 200.

Relay S10L controls switches 10L and 10C whose pivot ends connect by conductor 202 with conductor 188B. The fixed terminal of switch 10L connects with conductor 115, and the fixed terminal of switch 10C connects with conductor 200.

Relay S10X controls switches 10X and 10D whose pivot ends connect by conductor 203 with conductor 188B. The fixed terminal of switch 10X connects with conductor 116, and the fixed terminal of switch 10D connects with conductor 200.

Relay S5L controls switches 5L and 5D whose pivot ends connect by conductor 204 with conductor 188B. The fixed terminal of switch 5L connects with conductor 113, and the fixed terminal of switch 5D connects with conductor 200.

Relays S2L, S2B, and S1L, respectively, control switches 2LS, 2XS, 1LS whose pivot ends are respectively connected to conductor 188B by conductors 205, 206, and 207. The fixed terminals of these switches are respectively connected to conductors 99, 98, and 97.

Relay SML controls a switch LMS whose pivot end connects with conductor 188B and whose fixed terminal connects with conductor 96.

The coils of relay S50L, S25L, S10L, S10X, S5L, S2L, S2B, S1L, and SML have one of their terminals connected with the conductor 140. The other terminals of the coils of these relays respectively connect in the order named with conductor 190, conductor 158, conductor 198, conductor 155, conductor 154, conductor 189, conductor 180, and conductor 179.

A latch release solenoid SLL has its coil as a part of conductor 91. The depletion release key controls a switch connecting conductor 106 with conductor 152.

Where the keyboard is designed to be connected by extended leads from the machine, the outgoing leads are brought to a junction box 208 with which extension leads to the keyboard connect though as previously noted the keyboard can, if desired, be mounted on the machine. When the large keyboard is used, the lines 110 and 108 previously referred to in connection with the small keyboard are not used so that relays R2, R3, and R4 are not used as such but the switches RA2, RA3, and RA4 are used as parts of the conductors with which they connect. The conductor 140, not used with the small keyboard, is also used.

With the above described large keyboard, the bank of latchable solenoids S50L to SML are each described since these switches control the final passage of current to the push bar positioning solenoids S1¢ to S50¢ and also the energization of solenoid R1 to establish current flow through switch RA5 to the motor and clutch as previously described repetition of certain parts of the circuits will be avoided.

Solenoid SML when energized closes switch LMS connecting conductors 119, 188, 188B, 96, and 101A, 140, to coil 120 to energize relay R1 to shift switch RA1 to connect line conductor 80 with conductors 86 and 87, switch RA5 to close the motor circuit previously described. Energization of solenoid SML occurs when any one of the number keys 1, 2, 3, 4 or the special key 5 is depressed since current then flows from conductors 119 and 141 via its respective pivot end conductor (one of conductors 142, 143, 144, 145, or 146) through its key switch ML to conductor 153, coil of solenoid SML to conductor 140.

Solenoid S1L when energized closes switch 1LS connecting conductors 119, 188, 188B, and 97 to conductors 96 and 101A to energize solenoid S1¢ so that when the number 1 key is depressed, closing its switch ML to establish the motor circuit as above described, its switch EP is also closed to energize the coil of S1L, the current passing via conductor 119, 141, and 143 to conductor 179, coil of solenoid S1L to conductor 140 so that solenoid S1¢ can set its pusher bar to deliver one cent from the tray A when the motor is operated on the energization of relay R1 as above described. Solenoid S1L will also be energized by connection of conductors 143 and 179 to close switch 1LS when any one of the keys 11, 21, 31, 41, 51, 61, 71, 81, or 91 is depressed so that solenoid S1¢ will be energized through the same circuit to coil S1L as above described to dispense one cent.

Solenoid S2B when energized closes switch 2XS connecting conductor 119, 188, 188B, and 98 to conductors 96 and 101A to energize solenoid S2¢ so that when the number 2 key is depressed, its switch EP closes the circuit to coil S2B, the current passing via conductors 119, 141, 144, switch EP, conductors 180 and 140 so that solenoid S2¢ can set its pusher bar to deliver two cents from tray B. Depression of the number 2 key also closes its switch ML to energize solenoid SML and as previously described relay R1 to close the motor circuit to dispense the two cents, conductor 144 then being connected to conductor 153, solenoid S2B will also be energized by connection of conductors 144 and 180 to close switch 2XS when any one of the keys 12, 22, 32, 42, 52, 62, 72, 82, or 92 is depressed so that solenoid S2¢ will be energized through the same circuit to coil S2B as above described to dispense two cents.

Solenoid S2L when energized closes switch 2LS connecting conductors 119, 141, 188, 188B, and 99 to conductors 96 and 101A to energize solenoid SA2¢ so that when the number 3 key is depressed, closing its switch EP, current flows via conductors 119, 141, and 145, switch EP, conductor 181, coil of relay RL3, conductor 187 to return conductor 140, thereby energizing relay RL3 to close switches R3A and R3B. Closing switch R3B connects conductor 189 with conductor 188 to energize solenoid S2L, the circuit being conductors 119, 188, switch R3B, conductor 189, coil of solenoid S2L, conductor 140, coil 120, so that solenoid SA2¢ can set its pusher bar to deliver two cents from the tray C when the motor is operated. Closing switch R3A connects conductors 179 and 179A with conductors 188, 141, and 119, coil 120, conductor 140, and coil of solenoid S1L to energize this solenoid and close switch 1LS so that it will operate as heretofore described to energize solenoid S1¢. The switch ML of key 3 will also be closed so that current from coil 120, conductors 119, 141, and 144 will pass through this switch to conductor 153, coil of solenoid SML to conductor 140 energizing solenoid SML to close switch LMS which as previously noted establishes the motor circuit so that one cent from the tray A and two cents from the tray C is dispensed. Solenoids S2L, S1L, and SML will also be energized to dispense three cents as above described when any one of the keys 13, 23, 33, 43, 53, 63, 73, 83, or 93 is depressed since these EP switches connect the conductors 145 and 181 together.

Depression of the number 4 key energizes solenoids S2B, S1L, and SML to dispense two cents from each tray B and C, as follows: On closure of its EP switch current passes from coil 120 through conductors 119, 141, 146, the switch, conductors 182 and 182A, coil of relay RL4, conductors 187 and 140 energizing relay RL4 to close switches R4A and R4B to connect conductor 180A with conductors 180 and 188 and connect conductor 189A with conductors 189 and 188 to energize solenoids S2B and S1L which on the closure of their switches 2XS and 2LS energize solenoids S2¢ and SA2¢ so that two cents from each tray B and C can be dispensed when on the closure of the number 4 key's switch ML the coil of solenoid SML is energized by passage of current from feeder 141 to conductor 146, conductor 153, coil of solenoid SML to its return conductor 140 so that switch LMS is closed to close the motor circuit as previously described. Solenoids S2L, S2B will also be energized to dispense four cents as above described when any one of the keys 14, 24, 34, 44, 54, 64, 74, 84, or 94 is depressed since their EP switch connects the conductors 146 and 182 together.

Depression of the special number 5 key energizes solenoids S2B, S1L, 1LS, and SML to dispense two cents from each tray B and C and one cent from tray A, as follows: On closure of its EP switch, current passes from coil 120 through conductors 119, 141 and conductor 142, the switch conductor 173, coil of relay RL5, conductors 187 and 140 energizing relay RLR to close switches R5A and R5B to connect conductor 182 with conductor 188 and conductor 179B with conductor 179 and conductor 188. Closing switch R5A also energizes relay RL4 since current can flow from conductors 119, 141, 188 through switch R5A, conductor 182, conductor 182A, coil of relay RL4 to return conductors 187 and 140, thus closing switches R4A and R4B to energize solenoids S2L and S2B to effect the delivery of four pennies as previously described. Closing switch R5B energizes solenoid S1L through the circuit including conductors 188 and 179 as previously described so that switch 1LS is closed to effect delivery of one penny, and on the closing of switch ML of this special 5 key the feeders 141 and 153 are connected to energize the coil of solenoid SML to close the switch LMS to effect closing of the motor circuit as previously described.

Solenoid S5L when energized closes switches 5L and 5D to close the motor circuit and solenoid S5¢ circuit. On closing switch 5L current flows via conductors 119, 141, 188, 188B, conductor 204, the switch, conductor 113, RA2, conductor 114, RA3, conductor 100, coil of solenoid S5¢, conductors 96, 101A to coil 120 energizing solenoid S5¢ to set its push bar for the five cent tray D. On closing switch 5D current also passes from conductor 204 to conductors 200 and 96 energizing relay R1 to establish the motor circuit. Energization of solenoid S5L occurs when any one of the number keys 5, 15, 30, 40, 55, 65, 80, and 90 is depressed since on depressing key 5 current flows from coil 120, conductors 119 and 141 to feeder 147, switch ML of key 5, conductor 154, coil of solenoid S5L to return conductor 140, on depressing key 15 current from conductor 147 flows through its switch, conductor 156, coil of relay R15, conductor 187 to return conductor 140 thereby energizing relay R15 to close switch R15B so that current can flow from feeder 141, conductor 188, switch R15B, conductors 192B and 192 to conductor 154 and coil of solenoid S5L, on depressing key 30 current from conductors 119, 141, and 142 flows through the switch key conductor 158, conductor 159, coil of relay R30, conductor 187A, conductor 187 to return conductor 140, thereby energizing relay R30 to close switch R30B so that current can flow from feeder 141, conductor 188, switch R30A, conductors 192A and 192 to conductor 154, and the coil of solenoid S5L, and on depressing key 40 current flows from conductors 119, 141, and 142 through this switch key conductor 161 to coil of relay R40, conductor 187A, 187 to return conductors 140 thereby energizing relay R40 to close switch R40A so that current can flow from feeder 141, conductors 188, 188C, switch R40A, conductor 194, conductor 156, coil of relay R15, conductor 187 to return conductor 140, thereby energizing relay R15 which closes its switch R15A to establish the previously described circuit to operate relay S5L, on depressing key 55 current flows from conductors 119, 141, and 147 through this key's switch, conductor 166, coil of relay R55, conductors 187B, 187 to return conductor 140 energizing relay R55 to close switch R55A so that current can flow from feeder 141, to conductor 188, switch R55A, conductors 192, conductor 154, and the coil of solenoid S5L to operate said solenoid, on depressing key 65 current flows from conductors 119, 141, 147 through this key switch, conductor 166, coil of relay R65, conductors 187B, 187, and 140 thereby energizing relay R65 to close switch R65A so that current can flow from feeder 141, conductors 188, 188B, switch R65A, conductor 194, conductor 156, coil of relay R15, conductor 187 to return conductor 140, thereby energizing relay R15 to close switch R15A to establish the previously described circuit to operate relay S5L, on depressing key 80 current flows from conductors 119, 141, 142 through this key switch, conductor 169, coil of relay R80, conductors 187C, 187 to conductor 140 thereby energizing relay R80 to close switch R80A so that current can flow from feeder 141, conductors 188, 188A, switch R80A, conductors 191, 159, coil of relay R30, conductors 187A, 187 to return conductor 140 thereby energizing relay R30 which as noted above acts to energize relay S5L, on depressing key 90 current flows from conductors 119, 141, 142 through this key switch, conductor 170, coil of relay R90, conductor 187C, 187 to conductor 140 energizing relay R90 to close switch R90A so that current can flow from feeder 141, conductors 188, 188A, switch R90A, conductor 161A, coil of relay R40, conductors 187A, 187 to return conductor 140 energizing relay R40, which as noted above acts to energize relay S5L.

Depression of any of the number keys 6 to 9 also energizes solenoid S5L since in each instance conductor 154 and S5L is connected by the respective conductor 140, 149, 150, and 151 to the feeder 141 so that the same circuit is established as that for the number 5 key to energize solenoid S5¢ and close the motor circuit to dispense five cents. On depressing key 6 current from conductor 148 flows to conductor 183 and then to conductor 179 energizing solenoid S1L to act as previously described to dispense one cent. On depressing key 7 in addition to the five cents current from conductor 149 flows to conductor 184 and thence to conductor 180 energizing solenoid S2B to act as previously described to dispense two cents. On depressing key 8 in addition to the five cents, current from conductor 150 flows to conductor 185 and thence to conductor 181 which operates relay RL3 which we have seen acts to operate solenoids S2L and S1L and through them solenoids S1¢ and SA2¢ to dispense three cents. On depressing key 9 in addition to the five cents current from conductor 151 flows to conductors 186, 182, 182A to relay RL4 which we have seen acts to operate solenoids S2L and S2B and through them solenoids S2¢ and SA2¢ to dispense four cents.

Solenoid S10X when energized closes switches 10X and 10D to close the motor circuit and energize solenoid SA10¢. On closing switch 10X current flows via conductors 119, 141, 188, 188B, and 203, the switch, conductors 116, RB4, conductor 102, coil of solenoid SA10¢, conductors 96, 101A to coil 120 energizing solenoid SA10¢ to set its pusher bar for the ten cent tray E. On closing switch 10D current also passes from conductor 203 to conductors 200 and 96 energizing relay R1 to establish the motor circuit.

Energization of solenoid S10X occurs when any one of the number keys 10, 35, 20, 45, 60, 70, 85, or 95 are depressed. Depressing key 10 brings current from feeders 141 and 142, the switch key to conductor 155 to energize solenoid S10X. Depressing key 35 brings current from feeders 141, 147, the switch key, conductor 160, coil of solenoid R35 to close switch R35A so that current can flow to conductors 119, 141, 188, 188C, switch R35A, conductors 193A, 193, conductor 155 to energize solenoid S10X. Depressing key 20 brings current from feeders 141, 142, the switch key to conductor 157 energizing relay R20 to close switch R20A to conductor 155 to energize solenoid S10X. Depressing key 45 brings current from feeders 141, 147, the switch key to conductor 162 energizing relay R40 to close switch R45A so that current from conductors 141, 188, 188C can flow to conductors 195A, 195, 157 to energize relay R20 which we have seen acts through switch R20A to energize solenoid S10X. Depressing key 60 brings current from feeders 141, 142, the switch key to conductor 165 energizing relay R60 to close switch R60A so that current from conductors 141, 188, 188B can flow to conductors 193 and 155 to energize solenoid S10X. Depressing key 70 brings current from feeders 141, 142, the switch key to conductor 167 energizing relay R70 to close switch R70A so that current can flow from feeders 188, 188B to conductors 195 and 157 to energize relay R20 which closes switch R20A to energize solenoid S10X as previously described. Depressing key 85 brings current from feeders 141, 147, the switch key to conductor 170 energizing relay R85 to close switch R85A so that current from feeders 188 and 188A can flow to conductor 160A to energize relay R35 which as we have seen closes switch R35A to energize solenoid S10X. Depressing key 95 brings current from feeders 141, 147, the switch key to conductor 172 energizing relay R95 to close switch R95A so that current from feeders 188 and 188A can flow to conductors 162A and 162 to energize relay R45 to close switch R45A to energize solenoid S10X.

Solenoid S10L when energized closes switches 10L and 10C to close the motor circuit and energize solenoid S10¢. On closing switch 10L current flows via conductors 119, 141, 188, 188B, 202, the switch, conductor 115, RA4, conductor 103, coil of solenoid S10¢ to set its pusher bar for the ten cent tray F. On closing switch 10C current also passes from conductor 202 to conductors 200 and 96 energizing relay R1 to establish the motor circuit. Energization of solenoid S10L occurs when any one of the number keys 15, 20, 40, 45, 65, 70, 90, or 95 are depressed. Depressing key 15 we have seen energizes relay R15 to act through switch R15B and parts named to dispense five cents, and it also acts to close switch R15A so that current from feeders 141, 188, and 188D passes to conductors 197, 198 to energize solenoid S10L so that ten cents is dispensed from the tray associated with solenoid S10¢. Depressing key 20 we have seen energizes relay R20 to act through switch R20A to energize solenoid S10X and it also acts to close switch R20B to connect feeders 188 and 188D to conductor 198 to energize solenoid S10L so that both of the ten cent solenoids are energized to make up twenty cents. Depression of key 40 we have seen energizes relay R40 to act through switch R40A to energize relay R15 which as noted above acts to energize solenoids S10L. Depressing key 45 we have seen energizes relay R45 to act through switch R45A to energize relay R20 which as noted above acts to energize solenoid S10L. Depression of key 65 we have seen energizes relay R65 to close switch R65A and energize relay R15 which as noted above energizes solenoid S10L. Depressing key 70 we have seen energizes relay R70 to close switch R70A and energize relay R40 which as noted above energizes solenoid S10L. Depressing key 90 we have seen energizes relay R90 to close switch R90A to energize relay R40 to close switch R40A to energize relay R15 which as noted above energizes solenoid S10L. Depressing key 95 we have seen energizes relay R95 to close switch R95A to energize relay R45 to close switch R45A to energize relay R20 which as noted above energizes solenoid S10L.

Solenoid S25L when energized closes switches 25A and 25B to close the motor circuit and energize solenoid S25¢. On closing switch 25A current flows via conductors 119, 141, 188, 188B, 201, the switch, conductor 104, coil of solenoid S25¢ to set its pusher bar for the twenty-five cent tray G. On closing switch 25 current also passes from conductor 201 to conductors 200 and 96 energizing relay R1 to establish the motor circuit. Energization of solenoid S25L occurs when any one of the number keys 25, 30, 35, 40, 45, 75, 80, 85, 90, or 95 are depressed. Depressing key 25 brings current from feeders 141, 147, the switch key to conductor 158, coil of solenoid S25L to return conductor 140 to energize said solenoid. Depressing key 30 we have seen energizes relay R30 which closes switch R30B to connect feeders 188, 188C with conductor 158 and hence energize solenoid S25L. Depressing key 35 we have seen energizes relay R35 which closes switch R35B to connect feeders 188, 188C with conductor 158 and hence energize solenoid S25L. Depressing key 45 we have seen energizes relay R45 to connect feeders 188, 188C with conductor 158 and hence energize solenoid S25L. Depressing key 75 connects feeders 141 and 147 to conductor 168 to energize relay R75 to close switch R75B to connect feeders 188 and 188B with conductors 196 and 158 and hence energize solenoid S25L. Depressing key 80 we have seen energizes relay R80 to close switch R80A to energize relay R30 so that current from feeders 188 and 188C passes through this switch to conductor 158 to energize solenoid S25L. Depression of key 85 we have seen energizes relay R85 to close switch R85A so that current from feeders 188 and 188C passes through this switch to conductor 160A to energize relay R35 to close switch R35B to connect feeders 188 and 188C with conductor 158 to energize solenoid S25L. Depression of key 90 we have seen energizes relay R90 to close switch R90A so that current from feeders 188 and 188A passes through this switch to conductors 161A and 161 to energize relay R40 to close switch R40B to connect feeders 188 and 188C with conductor 158 to energize solenoid S25L. Depression of key 95 we have seen energizes relay R45 to close switch R95A so that current from feeders 188 and 188A passes through this switch to conductors 162A and 162 to energize relay R45 to close switch R45B to connect feeders 188 and 188C with conductor 158 to energize solenoid S25L.

Solenoid S50L when energized closes switches 50A and 50B to close the motor circuit and energize solenoid S50¢. On closing switch 50A current flows via conductors 119, 141, 188, 188B, 199, the switch, conductor 105, solenoid S50¢ to set its pusher bar for the fifty cent tray H. On closing switch 50B current also passes from conductor 199 to conductor 200 and 96 energizing relay R1 to establish the motor circuit.

Energization of solenoid S80L occurs when any one of the number keys 50, 55, 60, 65, 70, 75, 80, 85, 90, or 95 is depressed. Depressing key 50 brings current from feeders 141, 142, the switch key to conductors 163 and 190, coil of solenoid S50L to return conductor 140 to energize said solenoid. Depressing key 55 we have seen energizes relay R55 which closes switch R55B to connect feeder 188B with conductors 163 and 190 to energize solenoid S50L. Depression of key 60 we have seen energizes relay R60 which closes switch R60B to connect feeder 188B with conductors 163 and 190 to energize solenoid S50L. Depression of key 65 we have seen energizes relay R65 which closes switch R65B to similarly connect feeder 188B with conductor 190 to energize solenoid S50L. Depression of key 70 we have seen energizes relay R70 which closes switch R70B to similarly connect feeder 188B with conductor 190 to energize solenoid S50L. Depression of key 75 energizes relay R75 which closes switch R75B to similarly connect feeder 188B with conductor 190 to energize solenoid S50L. Depression of keys 80, 85, 90, and 95 respectively energizes relay R80, R85, R90, and R95 to respectively close switches R80B, R85B, R90B, and R95B to connect their common feeder 188 with conductor 190 to in each instance energize solenoid S50L.

From the above it will be noted that the dispensing of the least amount of coins from 1 to 9 and all those ending in zero or five above nine have been explained.

Depression of the keys 11, 12, 13, and 14 acts in the same way as the number 10 key to energize solenoid S10X to in each instance dispense 10 cents, and when the number 11 key is depressed, it acts in the same way as the number 1 key to energize solenoid S1L to dispense one cent, and when the number 12 key is depressed, it acts in the same way as the number 2 key to energize solenoid S2B to dispense two cents, and when the number 13 key is depressed, it acts in the same way as the number 3 key to energize solenoids S2L and S1L to dispense three cents, and when the number 14 key is depressed, it acts in the same way as the number four key to energize the solenoids S2B and S2L to dispense four cents.

Depression of the keys 21, 22, 23, and 24 acts in the same way as the number 20 key to energize solenoids S10X and S10L to in each instance dispense 20 cents, and these keys respectively act in the same way as the keys 1 to 4 to respectively dispense in addition 1, 2, 3, and 4 cents.

Depression of the keys 31, 32, 33, and 34 act in the same way as the number 30 key to energize the solenoids S25L and S5L to in each instance dispense 30 cents, and these keys respectively act in the same way as the keys 1 to 4 to respectively dispense in addition 1, 2, 3, and 4 cents.

Depression of the keys 41, 42, 43, and 44 act in the same way as the number 40 key to energize solenoids S25L, S5L, and S10L to in each instance dispense 40 cents, and these keys respectively act in the same way as the keys 1 to 4 to respectively dispense in addition 1, 2, 3, and 4 cents.

Depression of the keys 51, 52, 53, and 54 act in the same way as the number 50 key to energize solenoid S50L to in each instance dispense 50 cents, and these keys respectively act in the same way as the keys 1 to 4 to respectively dispense in addition 1, 2, 3, and 4 cents.

Depression of the keys 61, 62, 63, and 64 act in the same way as the number 60 key to energize solenoids S50L and S10X to in each instance dispense 60 cents, and these keys respectively act in the same way as the keys 1 to 4 to respectively dispense in addition 1, 2, 3, and 4 cents.

Depression of the keys 71, 72, 73, and 74 act in the same way as the number 70 key to energize solenoids S10X and S10L to in each instance dispense 70 cents, and these keys respectively act in the same way as the keys 1 to 4 to respectively dispense in addition 1, 2, 3, and 4 cents.

Depression of the keys 81, 82, 83, and 84 act in the same way as the number 80 key to energize solenoids S50L, S25L, and S5L to in each instance dispense 80 cents, and these keys respectively act in the same way as the keys 1 to 4 respectively to dispense in addition 1, 2, 3, and 4 cents.

Depression of the keys 91, 92, 93, and 94 act in the same way as the number 90 key to energize solenoids S50L, S25L, S10L, and S5L to in each instance dispense 90 cents, and these keys respectively act in the same way as the keys 1 to 4 to respectively dispense in addition 1, 2, 3, and 4 cents.

Depression of the keys 16, 17, 18, and 19 act in the same way as the number 15 key to energize solenoids S10L and S5L to in each instance dispense 15 cents, and these keys respectively act in the same way as the keys 6 to 9 to respectively dispense in addition 1, 2, 3, and 4 cents.

Depression of the keys 26, 27, 28, and 29 act in the same way as the number 25 key to energize the solenoid S25L to in each instance dispense 25 cents, and these keys respectively act in the same way as the keys 6 to 9 to respectively dispense in addition 1, 2, 3, and 4 cents.

Depression of the keys 36, 37, 38, and 39 act in the same way as the number 35 key to energize the solenoids S25L and S10X to in each instance dispense 35 cents, and these keys respectively act in the same way as the keys 6 to 9 to respectively dispense in addition 1, 2, 3, and 4 cents.

Depression of the keys 46, 47, 48, and 49 act in the same way as the number 45 key to energize the solenoids S25L, S10X, and S10L to in each instance dispense 45 cents, and these keys respectively act in the same way as the keys 6 to 9 to respectively dispense in addition 1, 2, 3, and 4 cents.

Depression of the keys 56, 57, 58, and 59 act in the same way as the number 55 key to energize the solenoids S50L and S5L to in each instance dispense 55 cents, and these keys respectively act in the same way as the keys 6 to 9 to respectively dispense in addition 1, 2, 3, and 4 cents.

Depression of the keys 66, 67, 68, and 69 act in the same way as the number 65 key to energize the solenoids S50L, S10L, and S5L to in each instance dispense 65 cents, and these keys respectively act in the same way as the keys 6 to 9 to respectively dispense in addition 1, 2, 3, and 4 cents.

Depression of the keys 76, 77, 78, and 79 act in the same way as the number 75 key to energize the solenoids S50L and S25L to in each instance dispense 75 cents, and these keys respectively act in the same way as the keys 6 to 9 to respectively dispense in addition 1, 2, 3, and 4 cents.

Depression of the keys 86, 87, 88, and 89 act in the same way as the number 85 key to energize the solenoids S50L, S25L, and S10X to in each instance dispense 85 cents, and these keys respectively act in the same way as the keys 6 to 9 to respectively dispense in addition 1, 2, 3, and 4 cents.

Depression of the keys 96, 97, 98, and 99 act in the same way as the number 95 key to energize the solenoids S50L, S25L, S10X, and S10L to in each instance dispense 95 cents, and these keys respectively act in the same way as the keys 6 to 9 to respectively dispense in addition 1, 2, 3, and 4 cents.

When the special key 10 is depressed, its upper switch connects feeders 141 and 152 with conductors 174 and 154 to energize solenoid S5L to close the motor circuit and energize solenoid S5¢ to dispense 5 cents, and its lower switch connects the above named feeders with conductor 173 to energize solenoid RL5 which we have seen acts to dispense 5 pennies.

When the special key 25 is depressed, its upper switch connects feeder 152 with conductors 178 and 156 to energize relay R15 which we have seen acts to dispense ten cents and five cents, and its lower switch connects feeder 152 with conductors 175 and 155 to energize solenoid S10X which we have seen acts to dispense 10 cents.

When the special key 50 is depressed, its upper switch connects feeder 152 with conductors 176 and 160 to energize relay R35 which we have seen acts to dispense twenty-five and ten cents and its lower switch connects feeder 152 to conductors 178 and 156 to energize relay R15 which we have seen acts to dispense ten cents and five cents.

When the special key 100 is depressed, its upper switch connects feeder 152 with conductors 177 and 170 to energize relay R85 which we have seen acts to dispense fifty cents, twenty-five cents, and ten cents, and its lower switch connects feeder 152 to conductors 178 and 156 to energize relay R15 which we have seen acts to dispense ten cents and five cents.

Depression of the the depletion release key acts in the same way as the similar key on the small keyboard to connect feeders 119, 141, and 152 to conductor 106 to energize relay R6 to close switch 60 so that on depression of any one of the keys the motor will be operated to cause another dispensing operation.

Also the solenoid S5L of this large keyboard acts in the same way as the solenoid S3 of the small keyboard to release the latches, in this case of the control solenoids S50L, S25L, S10L, S10X, S5L, S2L, S2B, S1L, and SML, should any of them be latched, as the motor M completes its operation and acts to shift the switch member 57A to connect conductor 86 with conductor 91 to close the circuit to solenoid S3.

We desire it to be understood that this invention is not to be limited to any particular form or arrangement of parts except in so far as such limitations are included in the claims.

What we claim as our invention is:

1. In a coin dispensing machine, the combination of a coin compartment, coin ejector mechanism for said compartment including a shiftable member, electrically energized means for positioning said shiftable member to render said ejector mechanism operable, an electric motor operatively connectible with said shiftable member to operate said ejector mechanism when said shiftable member is in operative position, an operator controlled key for controlling said electrically energized means, means also controlled by said key to energize said motor, a latch for said key to hold it when depressed, electrically energized means for releasing said latch, electrical circuits for supplying current to the first named electrically energized means, said motor, and said electrically operated latch release means, a control switch in the circuit for said electrically operated latch release means, an operating member for said switch, cam means driven by said motor for actuating said operating member after said motor has operated an ejector mechanism, a latch for holding said operating member in its operated position, electrically enregized means for releasing said last named latch at the end of a dispensing operation, and a control switch for said last named means controlled by said key and operable to deenergize said means at the start of a dispensing operation.

2. In a coin dispensing machine, the combination of a tray having a coin compartment, coin ejector mechanism for said compartment, operating means for said ejector mechanism including an electrically energized means, means for supplying current to said electrically energized means, a control switch for said last named means, a coin engaging member movable in response to coin depletion, a yieldable actuator for said control switch normally acting on said member to put pressure on said member to move the same if the coins in said compartment become depleted, a movable support for said switch, a stop normally preventing movement of said support to maintain the pressure of said actuator on said member, and an electrically energized power means for moving said stop after each operation of said ejector mechanism to permit movement of said support to relieve the pressure on said actuator and member and thereby relieve pressure on the coins in said compartment contacting said member.

3. In a coin dispensing machine, the combination of a coin tray having three penny compartments, one nickel compartment, two dime compartments, one quarter compartment and one half dollar compartment, coin ejector mechanism for each compartment to eject one coin each from said nickel, dime, quarter, half dollar and one of said penny compartments, and two cents from each of said other penny compartments, electrically controlled and operated settable members for determining which of said ejector mechanisms shall be operative to dispense coins, electrically operated means for operating the ejector mechanisms rendered operable by said settable members, electrical circuits controlling said electrically operated means and the electrically operated settable means including a source of current and a plurality of selectively operable relays, a keyboard having keys numbered 1 to 99, switches operable by said keys for establishing current supply to said circuits to operate the ejector mechanisms to dispense the amount represented by the number of the selected keyboard key, the aforesaid selectively operable relays being operable to control the operation of those ejector mechanisms which will dispense the least number of coins of the denominations of coins to make up the amounts of money to be dispensed ending in zero or five.

4. The coin dispensing machine as defined in claim 3 wherein additional relays are provided for controlling the dispensing of one, two, three, and four cents by the selective operation of the ejector mechanisms for the three penny compartments.

5. The coin dispensing machine as defined in claim 3 having a special five cent key and relays operable on the depression of said key to control the simultaneous operation of the ejector mechanisms for the three penny compartments.

6. The coin dispensing machine as defined in claim 3 having a special 10 cent key and relays operable on the depression of said key to control the simultaneous operation of the ejector mechanisms for the three penny compartments and a relay operable to control the ejector mechanism of the nickel compartment.

7. The coin dispensing machine as defined in claim 3 having a special 25 cent key to control the simultaneous operation of the ejector mechanisms for the two dime compartments and the operation of the ejector mechanism for the nickel compartment.

8. The coin dispensing machine as defined in claim 3 having a special 50 cent key to control said R20 relay to control the operation of the ejector mechanisms for the two dime compartments and mechanism for the nickel compartment and the operation of the ejector mechanism for the quarter compartment.

9. The coin dispensing machine as defined in claim 3 having a special one dollar key to control the operation of the fifty cent compartment, to control said relay R20 to control the operation of the ejector mechanisms for the two dime compartments, the nickel compartments, and the quarter compartment.

10. In a coin dispensing machine, the combination of a coin tray having a coin compartment, coin ejector mechanism for said compartment, operating means for said ejector mechanism including an electrically energized means, a current supply circuit for said electrically energized means, a latchable relay in said circuit for establishing current flow through said means, including a normally open switch, a relay including a normally closed switch in said circuit, means for operating said relay to open said normally closed switch in the event of coin depletion in said compartment, a latch for said latchable relay to hold said normally open switch in its open position, means operative on a coin depletion to release said latch, and an operator controlled switch in the circuit for said latchable relay to establish current flow thereto to close its switch for establishing the current flow through said electrically energized means.

11. The coin dispensing machine as defined in claim 10 wherein a pair of signal lights are provided, one of said lights indicating normal operation and the other that a coin depletion has occurred, and electrical circuits for supplying current to said lights, switches in said circuits to respectively control said lights, the switch for said first named light being controlled by said latchable relay and the switch for the other light being controlled by the relay including said normally open switch when the same is opened in the event of coin depletion in said compartment.

References Cited in the file of this patent

UNITED STATES PATENTS

| | | |
|---|---|---|
| 1,007,167 | Wickline | Oct. 31, 1911 |
| 1,195,829 | McDermott | Aug. 22, 1916 |
| 1,356,379 | McDermott | Oct. 19, 1920 |
| 1,820,343 | Brandt | Aug. 25, 1931 |
| 1,944,313 | Brandt | Jan. 23, 1934 |
| 2,311,732 | Buchholz | Feb. 23, 1943 |
| 2,406,948 | Hoffman et al. | Sept. 3, 1946 |
| 2,491,900 | Mihalek | Dec. 20, 1949 |
| 2,547,563 | Buchholz | Apr. 3, 1951 |
| 2,571,596 | Meredith et al. | Oct. 16, 1951 |

FOREIGN PATENTS

| | | |
|---|---|---|
| 83,920 | Norway | May 8, 1954 |